United States Patent [19]

Dulong

[11] Patent Number: 5,560,039

[45] Date of Patent: Sep. 24, 1996

[54] APPARATUS AND METHOD FOR A FOUR ADDRESS ARITHMETIC UNIT

[75] Inventor: Carole Dulong, Saratoga, Calif.

[73] Assignee: Intel Corporation, Santa Clara, Calif.

[21] Appl. No.: 581,761

[22] Filed: Jan. 2, 1996

Related U.S. Application Data

[63] Continuation of Ser. No. 22,541, Feb. 25, 1993, abandoned.

[51] Int. Cl.$^6$ ................................................. G06F 7/38
[52] U.S. Cl. .................. 395/800; 395/375; 364/DIG. 2; 364/946.3; 364/946.2; 364/923.6; 364/924
[58] Field of Search .................................. 395/800, 375, 395/2; 381/41–43; 382/218

[56] References Cited

U.S. PATENT DOCUMENTS

| | | | |
|---|---|---|---|
| 4,084,235 | 4/1978 | Hirtle et al. | 364/200 |
| 4,209,841 | 6/1980 | Bambara et al. | 364/200 |
| 4,250,545 | 2/1981 | Blahut et al. | 395/375 |
| 4,295,193 | 10/1981 | Pomerene | 364/200 |
| 4,373,191 | 2/1983 | Fette et al. | 364/724 |
| 4,395,699 | 7/1983 | Sternberg | 382/41 |
| 4,414,626 | 11/1983 | Arai et al. | 364/200 |

(List continued on next page.)

FOREIGN PATENT DOCUMENTS

| | | |
|---|---|---|
| 0550865 | 7/1993 | European Pat. Off. . |
| 58-024975 | 2/1983 | Japan . |
| 63-282586 | 11/1988 | Japan . |

OTHER PUBLICATIONS

English Translation of Japanese Kokai 58–24975 (to Komiya, publ. Feb. 15, 1983).

English Translation of Japanese Kokai 63–282586 (to Minewaki, publ. Nov. 18, 1988).

Labrousse et al., "Create–Life: A Modular Design Approach for High Performance ASICs", Mar. 2, 1990.

Adams et al., "Utilizing Low Level Parallelism in General Purpose Code: The HARP Project", Microprocessing and Microprogramming 29 (1990) 137–149.

DeGloria et al., "A Programmable Instruction Format Extension to VLIW Architectures", Comp Eur 1992 Proceedings, May 4–8, 1992.

Matterne et al., "A Flexible High Performance 2–D Discrete Cosine Transform I.C.,", Phillips Research Laboratories, IEEE 1989.

Houzet et al., "GFlops: A General Flexible Linearly Organized Parallel Structure for Images", IEEE 1991.

Steven et al., "iHarp: A Multiple Instruction Issue Processor", IEEE Proceedings—E, vol. 139, No,. 5, Sep. 1992.

*Primary Examiner*—Larry D. Donaghue
*Attorney, Agent, or Firm*—Blakely, Sokoloff, Taylor & Zafman

[57] ABSTRACT

An instruction execution unit having an instruction format with four addresses. Two of the addresses may be defined as sources for operands. Two of the four addresses may be defined as a destination for the result of the computational unit and a pointer updated by a pointer pipeline. There are two arithmetic pipelines, and two pointer pipelines that operate in parallel to perform computations indicated by specially developed instruction format. The pipelines are specially optimized for Hidden Markov Models and Dynamic Time Warping procedures used for pattern recognition. The available addresses that can be used as two sources of operands are not symmetrical. Therefore, the instruction set is implemented such that operations are defined in pairs with counterpart operations using reciprocal operands to add full flexibility to the arithmetic pipeline. Using four address instruction format with a specialized type field, the present invention is able to develop a fully flexible addressing scheme offering up to 27 different addressing combinations for each instruction format. Further, computations within an arithmetic pipeline may be performed utilizing source data in byte or word format within any degradation in processing efficiency.

52 Claims, 10 Drawing Sheets

U.S. PATENT DOCUMENTS

| | | | |
|---|---|---|---|
| 4,654,785 | 3/1987 | Nishiyama et al. | 364/200 |
| 4,766,566 | 8/1988 | Chuang | 364/900 |
| 4,790,026 | 12/1988 | Gennery et al. | 382/49 |
| 4,819,233 | 4/1989 | Delucia et al. | 371/19 |
| 4,849,921 | 7/1989 | Yasumoto et al. | 364/715.01 |
| 4,953,115 | 8/1990 | Kanoh | 364/715.01 |
| 4,982,352 | 1/1991 | Taylor et al. | 364/715.01 |
| 5,014,327 | 5/1991 | Potter et al. | 382/14 |
| 5,045,993 | 9/1991 | Murakami et al. | 364/200 |
| 5,050,068 | 9/1991 | Dollas et al. | 364/200 |
| 5,051,940 | 9/1991 | Vassiliadis et al. | 364/736 |
| 5,111,512 | 5/1992 | Fan et al. | 382/3 |
| 5,142,634 | 8/1992 | Fite et al. | 395/375 |
| 5,148,386 | 9/1992 | Hori | 364/768 |
| 5,202,967 | 4/1993 | Matsuzaki et al. | 395/375 |
| 5,203,002 | 4/1993 | Wetzel | 395/800 |
| 5,226,091 | 7/1993 | Howell et al. | 382/3 |
| 5,255,378 | 10/1993 | Crawford et al. | 395/325 |
| 5,265,174 | 11/1993 | Nakatsuka | 382/38 |
| 5,299,321 | 3/1994 | Iizuka | 395/375 |
| 5,303,356 | 4/1994 | Vassiliadis et al. | 395/375 |
| 5,333,280 | 7/1994 | Ishikawa et al. | 395/375 |
| 5,367,650 | 11/1994 | Sharangpani et al. | 395/375 |
| 5,371,864 | 12/1994 | Chuang | 395/375 |
| 5,404,552 | 4/1995 | Ikenaga | 395/800 |
| 5,408,625 | 4/1995 | Narita et al. | 395/375 |
| 5,416,913 | 5/1995 | Grochowski et al. | 395/375 |
| 5,434,872 | 7/1995 | Petersen et al. | 371/57.1 |
| 5,437,042 | 7/1995 | Culley et al. | 395/800 |
| 5,452,432 | 9/1995 | Macachor | 395/425 |
| 5,459,798 | 10/1995 | Bailey et al. | 382/218 |
| 5,485,629 | 1/1996 | Dulong | 395/800 |

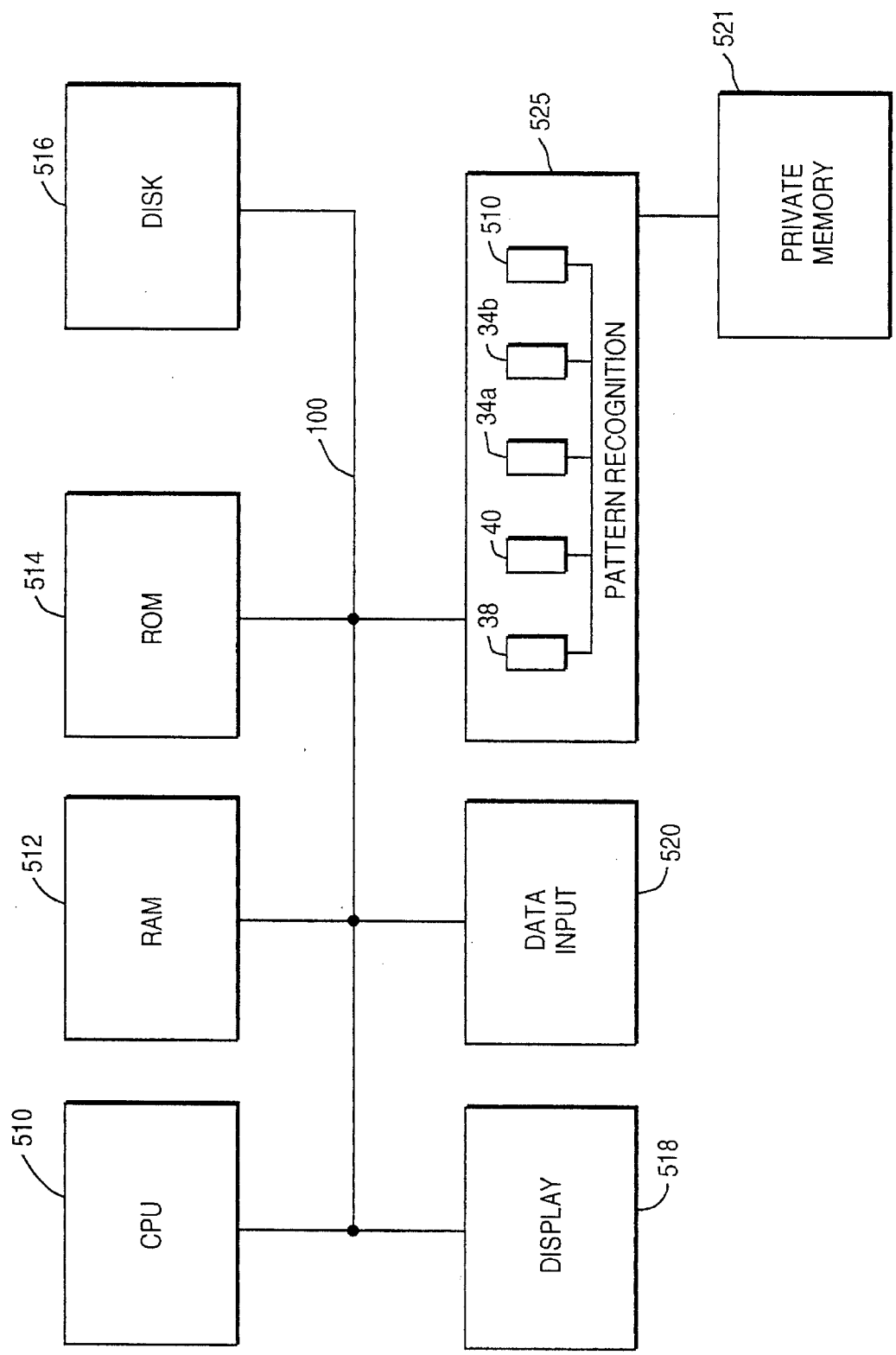
FIG_1

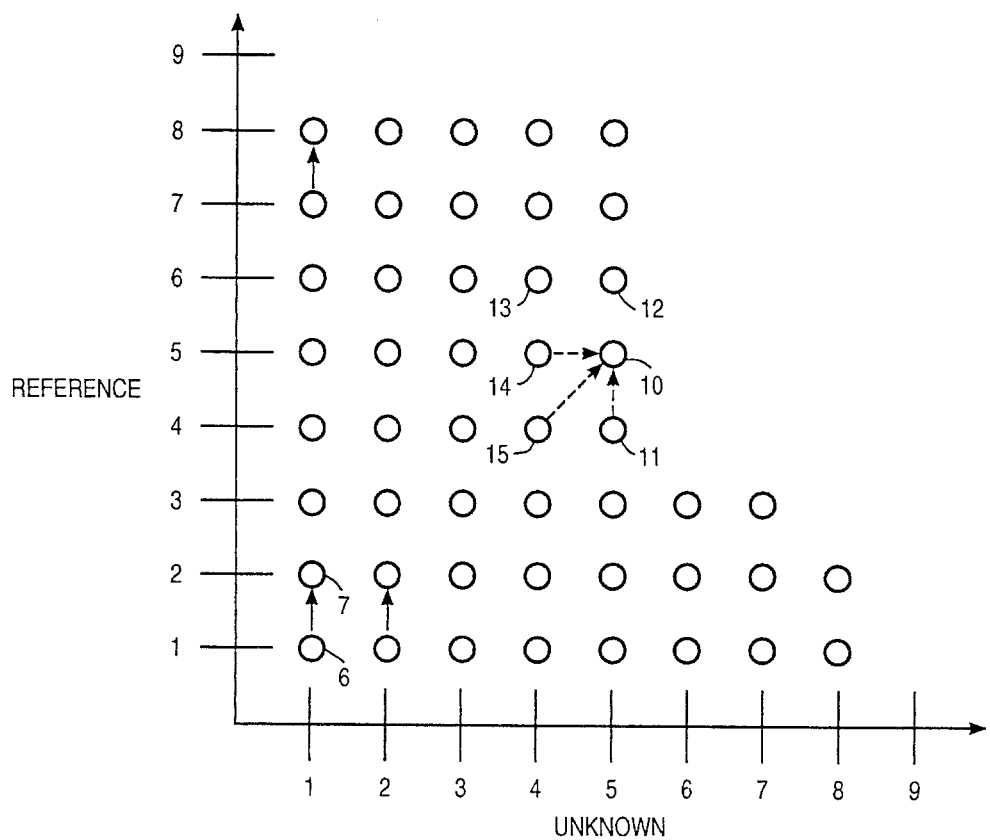
FIG_2A
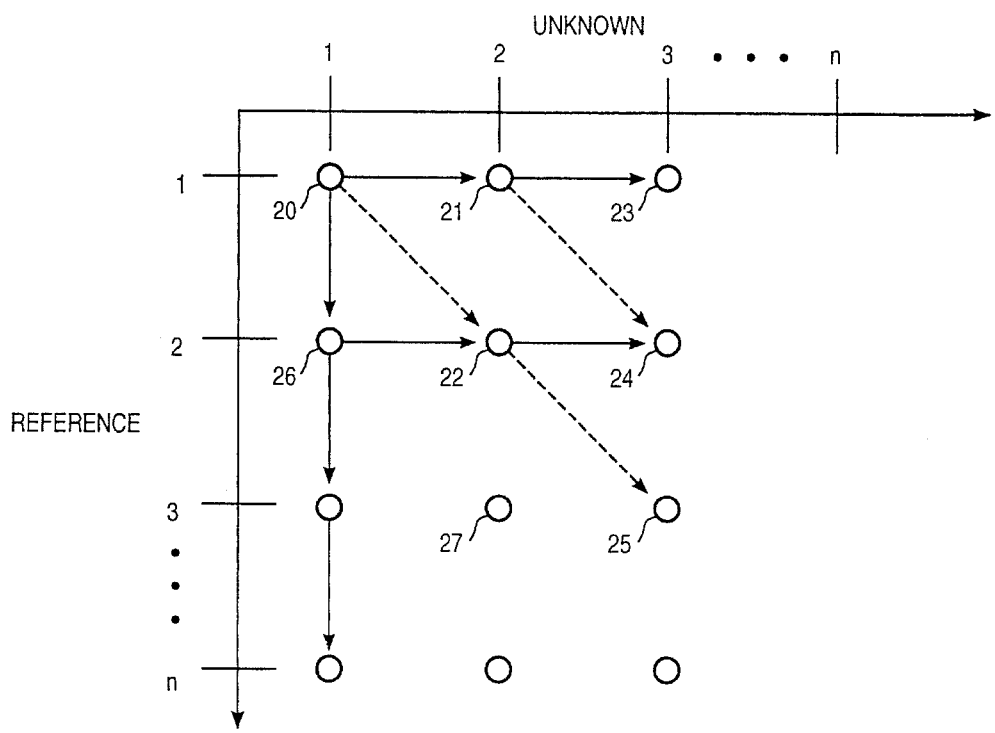
FIG_2B

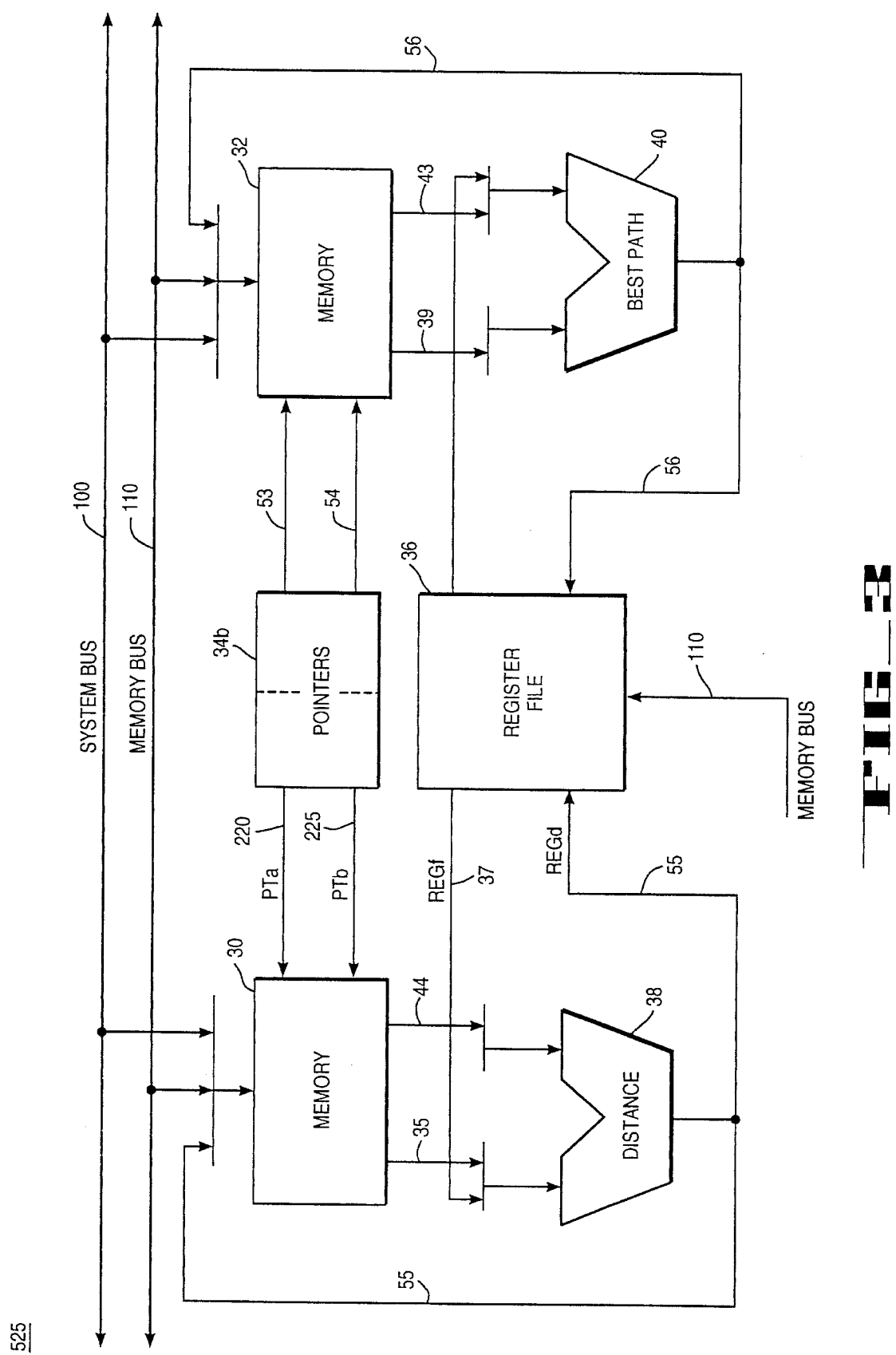
FIG_3

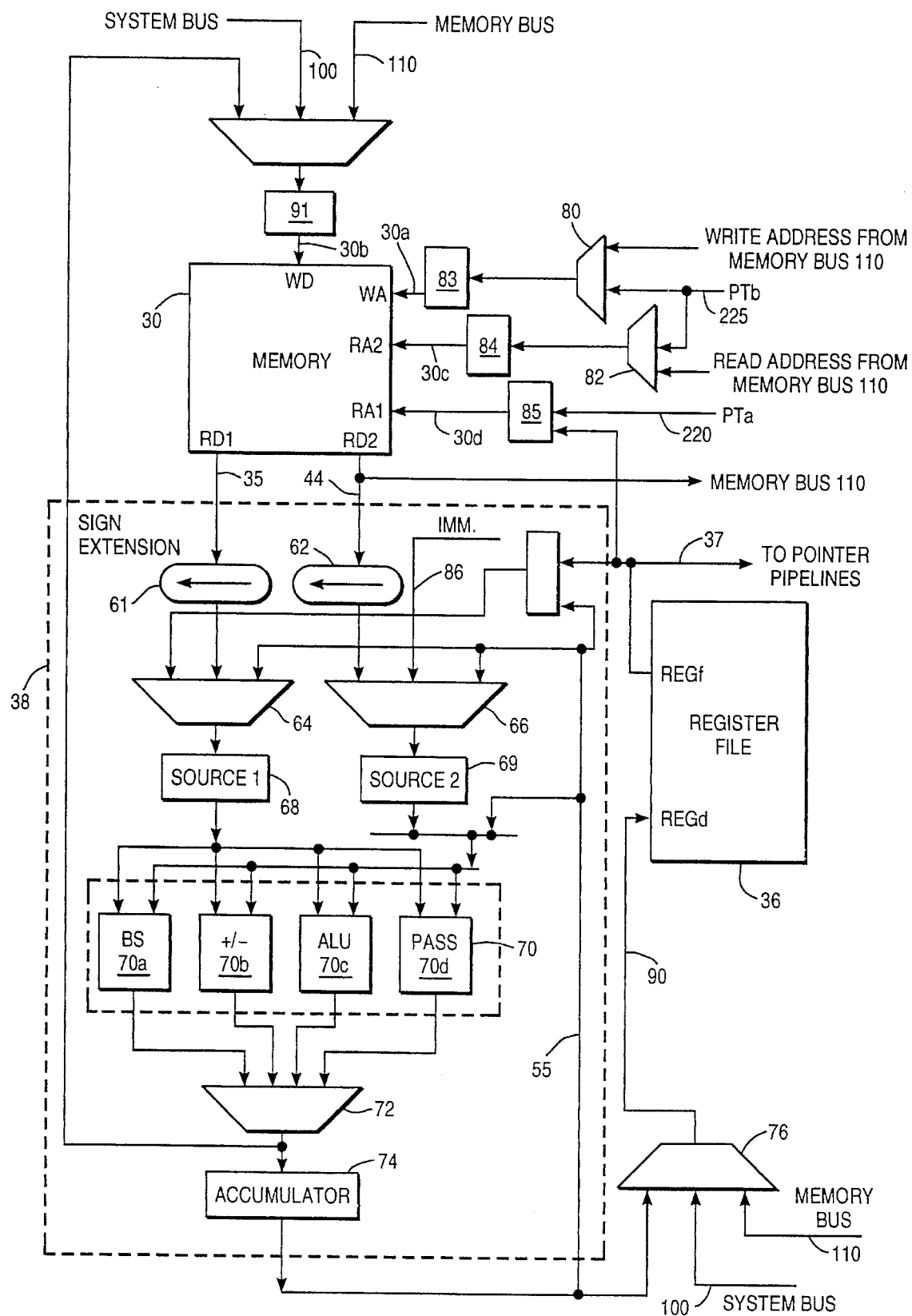
FIG_4

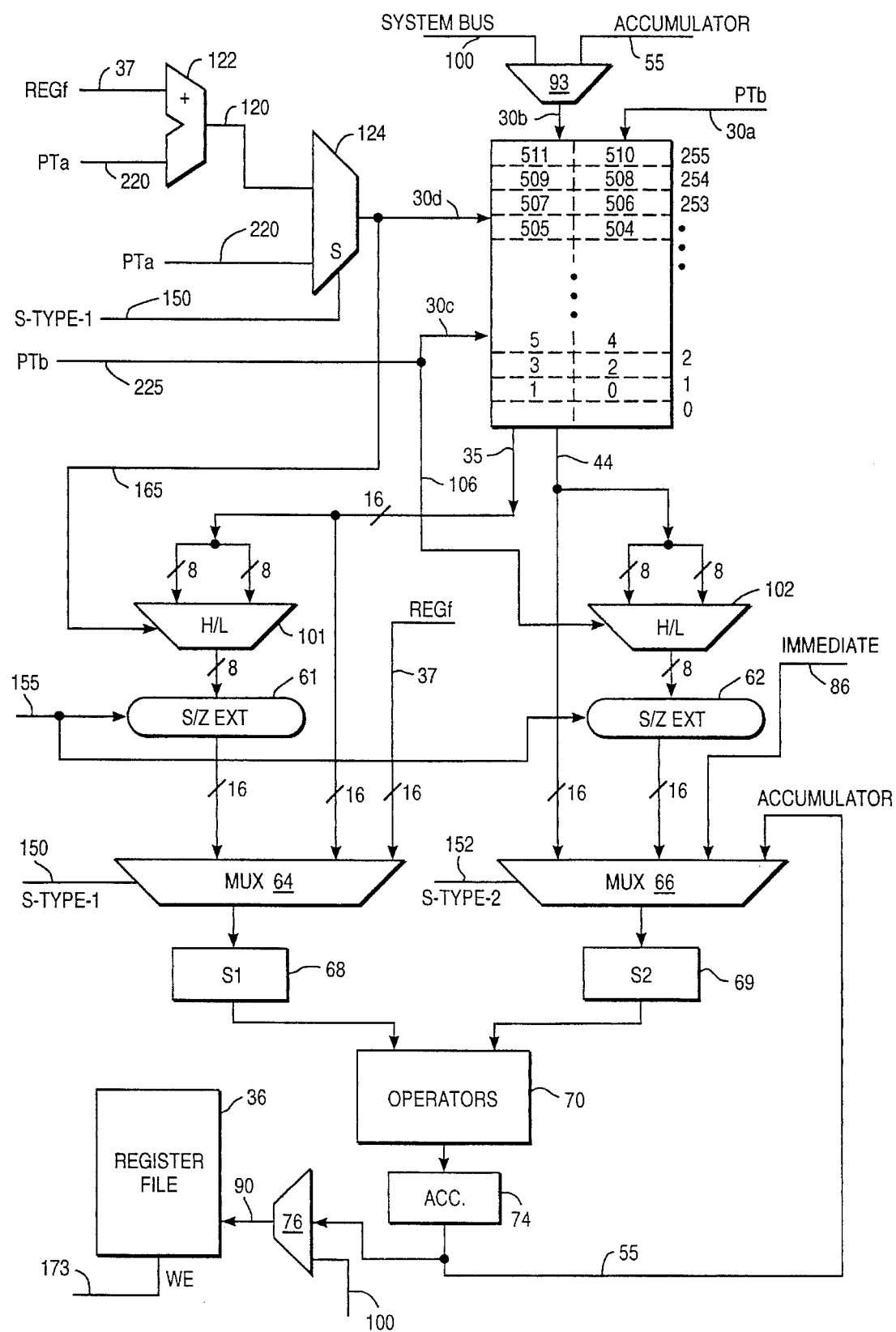
FIG_5

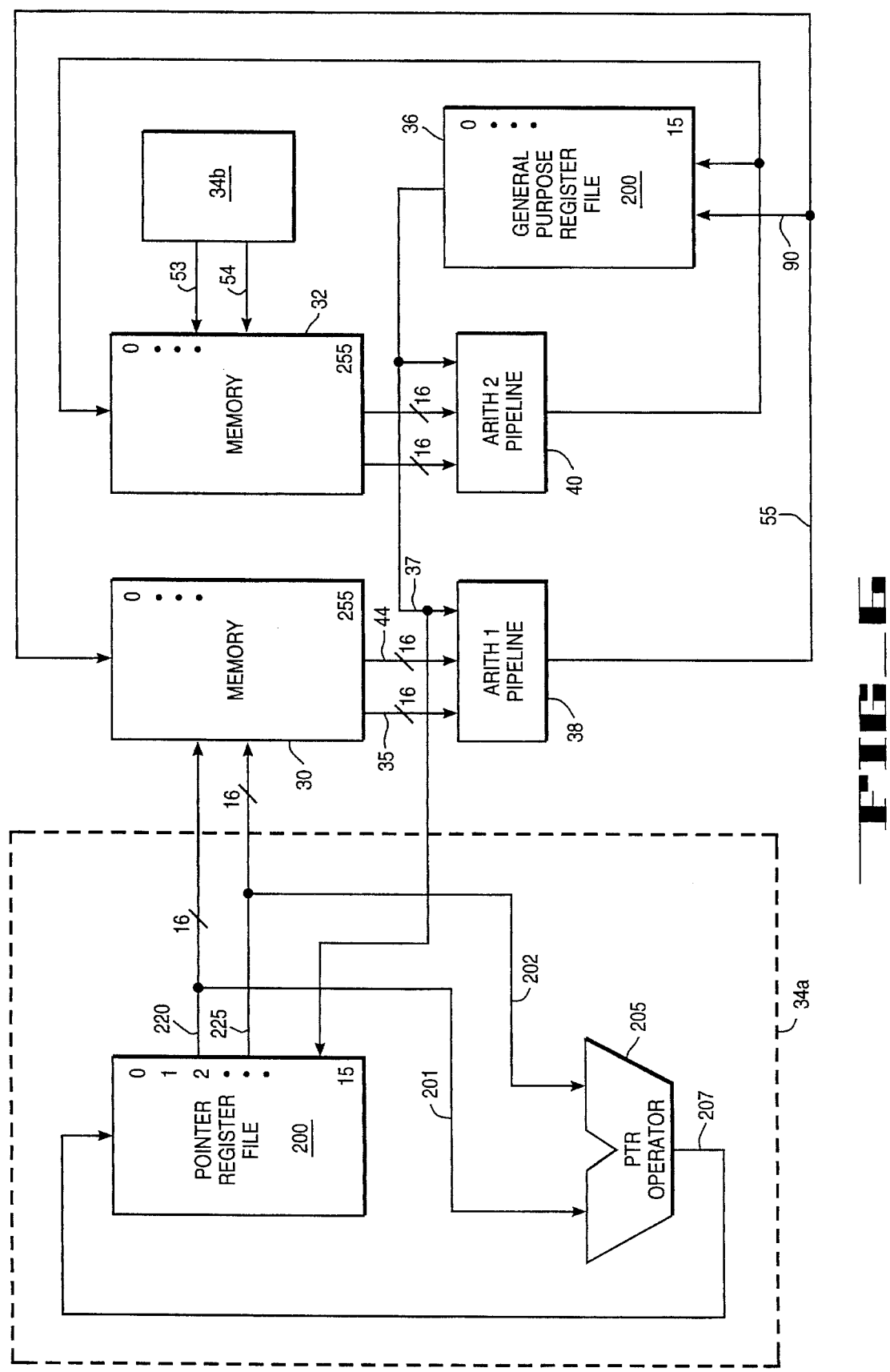
FIG_6

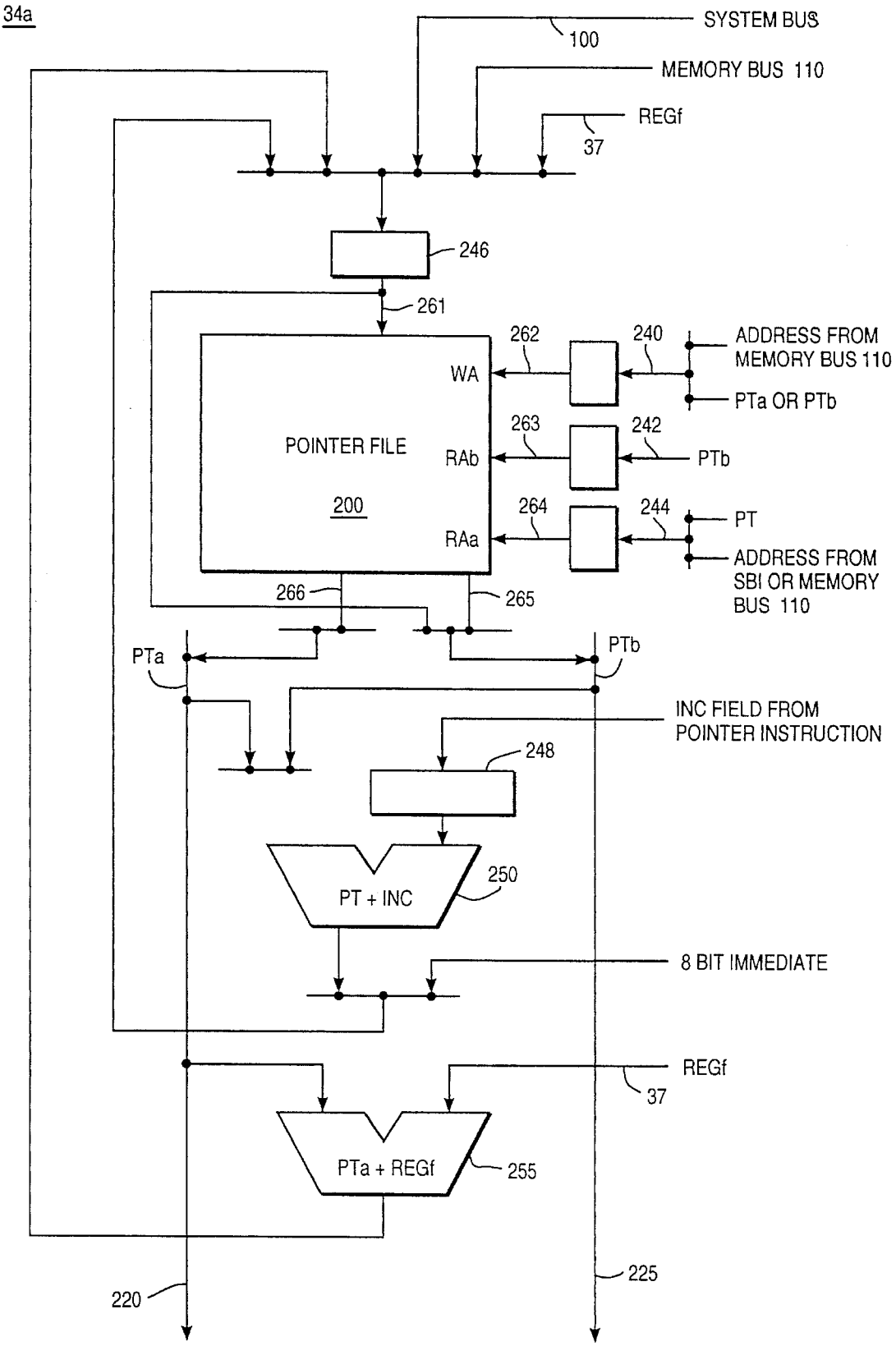
FIG_7

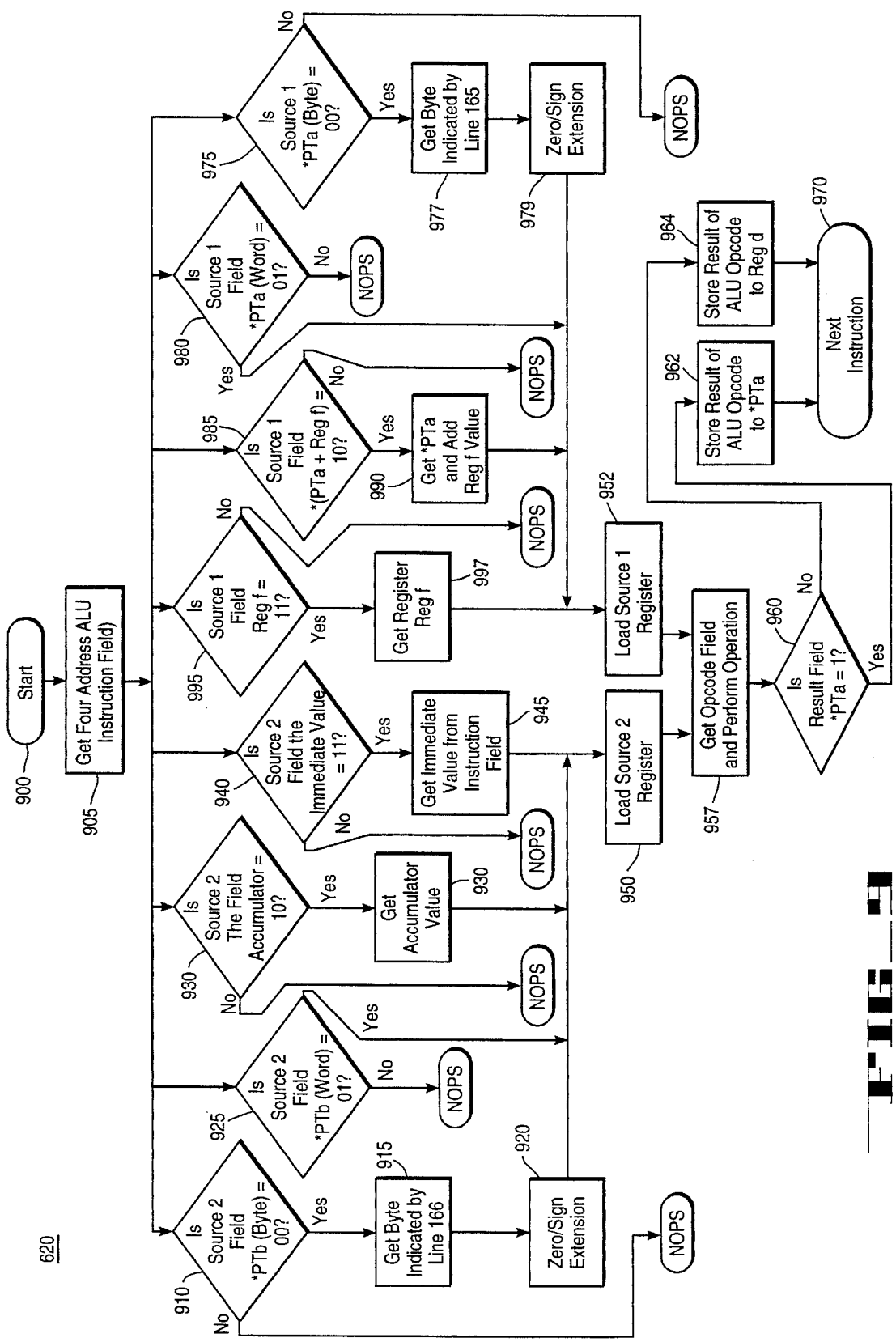
FIG_5

APPARATUS AND METHOD FOR A FOUR ADDRESS ARITHMETIC UNIT

This is a continuation of application Ser. No. 08/022,541, filed Feb. 25, 1993, now abandoned.

BACKGROUND OF THE INVENTION (1) Field of the Invention

The present invention relates to the field of computation and logic units. Specifically, the present invention relates to the field of addressing schemes for an arithmetic integer pipeline ("arithmetic pipeline").

(2) Prior Art

Arithmetic and logic computations are typically performed within a digital computer by specialized components designed in hardware. One hardware unit developed for addition and subtraction as well as other logical functions is called an arithmetic integer pipeline ("unit") which may be implemented for executing arithmetic instructions, sometimes called ALU instructions. Another hardware unit of a digital computer designed for mathematical functions is a multiplier. Common to all prior art hardware components utilized for arithmetic and logic computations is that they address two, three or four operands (which are addresses) to perform a particular calculation or relationship. Operands may come from a register file or may be indirectly accessed using the values of a register file.

In order to perform a set of operations that select from four or more operands (i.e., utilize four or more addresses), prior art calculation units must perform two or more instructions in more than one instruction cycle. It would be desirable to be able to utilize more than three addresses per instruction for computations that involve two operations and perform the above within only one instruction cycle. The present invention offers this advantageous function so that only one instruction cycle is consumed and two operations may be performed on the four addresses.

Specifically, in prior art calculation devices, instructions are executed in sequence to perform calculations. Often pointers are utilized in order to access the operands that are used in computations. When an operand used in a computation is indicated as a pointer, the syntax "*" is used before that pointer operand. Therefore, "*A" indicates that the value of operand A is actually an address that will point to a memory location where the desired operand is located. In this case the value A is a pointer to the operand. Once the computation involving this operand is complete, it is typically necessary to update the pointer so that another data operand can be accessed in a next or succedent operation. When operands are stored sequentially in a data file in memory, the pointers to these operands are updated or incremented upon each calculation. The below pair of instructions illustrate how a prior art system would perform the above functions:

$C = *[A+P] + B$

Increment P

The first instruction above involves four addresses. The value of operand B will be added to the value of an address pointed to by the value of A offset by the value of P. This result will be added to operand C. After, the value of P, the pointer, will be incremented so that [A+P] points to a new data value for computation. If the above instructions are executed again, the same value of B will be used and it will be added to a new value because the pointer "*[A+P]" was updated. This new result will be added to operand C. In order to perform the above, four addresses and two instruction cycles are required in prior art systems; one cycle for the computation and another cycle for the pointer update. What is desired is a system that would allow the pointer increment cycle to take place during the same instruction cycle as the computation cycle. This would reduce the overall processing time of the computer calculator to accomplish the above instructions. This would also offer some flexibility because the above sequence of steps is executed routinely in computer calculators. The present invention offers such parallel functionality with an instruction having four addresses.

Additionally, prior art computation units process operations on operands that are either in byte length (8 bits) or in word length (two bytes) but not a mixture of both without some performance loss. Therefore, the above operations will process one or two source operands that are either all in word length or all in type length. If there is a mixture of the two, the computation units of the prior art must perform a conversion between the operand lengths and this conversion forces the operation to execute outside of one computation cycle. What is desired is a processing or computation unit that allows a mixture of operand lengths within operands of one computation instruction while allowing the computation instruction to execute within one instruction cycle. The present invention allows such capability.

General purpose computer calculators and computation units are used by computer systems in order to perform pattern recognition for voice and handwriting recognition algorithms. These pattern recognition algorithms have particular calculations and calculation types that are executed in sequence in predetermined and repetitive manners. It would be desirable to be able to fashion a specially optimized arithmetic pipeline to process the steps required in a pattern recognition procedure. The present invention offers such capability.

Further, in systems that are developed for pattern recognition applications, specifically Dynamic Time Warping applications, computations are required to compute distance and best path values. Prior art systems for performing such computations involve one arithmetic pipeline. It would be advantageous to provide two specialized arithmetic pipelines, one optimized for DTW distance computations and the other optimized for DTW best path computations. The present invention offers such capability.

Accordingly, it is an object of the present invention to provide a single instruction format having both a register indexing mode function and an index update function that may occur within the same instruction cycle. It is an object of the present invention to be able to combine four addresses within a single computation instruction within an arithmetic pipeline device. It is further an object of the present invention to be able to process in parallel both a pointer update instruction as well as a computation instruction that utilizes the pointer value and is updated in parallel. It is also an object of the present invention to be able to execute an operation having operands of different lengths within one instruction cycle. It is yet another object of the present invention to provide the above functions in an arithmetic pipeline that is specially optimized for pattern recognition procedures to provide high speed pattern recognition capability. It is an object of the present invention to provide two arithmetic pipelines that operate in parallel for pattern recognition applications; one pipeline optimized for distance computations and the other pipeline optimized for best path computations. These and other objects of the present invention not specifically mentioned above will come in the discussions to follow.

SUMMARY OF THE INVENTION

The present invention includes an embodiment covering an apparatus for executing an arithmetic instruction, the instruction including more than three addresses, the apparatus including: means for selecting a first source of information from an address of the more than three addresses specified within the arithmetic instruction; means for selecting a second source of information from an address of the more than three addresses specified within the arithmetic instruction; means for performing an operation upon the first source and the second source to generate a result, the operation specified within the arithmetic instruction; means for selecting a destination storage for the result from an address of the more than three addresses specified within the arithmetic instruction; and means for updating a pointer represented as an address of the more than three addresses specified within the arithmetic instruction, the means for updating and the means for performing operations in parallel. The present invention includes an embodiment as described above and wherein the means for selecting a first source selects from a first or a second address; the means for selecting a second source selects from a third address; and the means for selecting a destination storage selects from a fourth address or the third address.

The present invention includes an embodiment covering an apparatus for performing computations including: arithmetic logic means for executing an arithmetic instruction, the arithmetic instruction comprising address means for specifying locations of operands, the arithmetic instruction further comprising an operation performed on the operands; and pointer means for executing a pointer instruction, the pointer instruction for updating the address means for a succedent arithmetic instruction based on a pointer operation specified within the pointer instruction, the pointer means also for executing the pointer instruction in parallel with the arithmetic instruction.

The present invention includes an embodiment covering an apparatus as described above and wherein the means for selecting a first storage (using different addressing modes having direct and indirect mechanisms) and the means for selecting a second storage do not select addresses from among a same address set because the addressing modes arc not symmetrical and further comprising pairs of complementary arithmetic operations for noncommutative operations.

BRIEF DESCRIPTION OF THE DRAWINGS

FIG. 1 is a block diagram of the overall system in which embodiments of the present invention may advantageously operate.

FIG. 2(A) is an illustration of a DTW pattern recognition lattice and individual points comparing a known pattern against an unknown pattern.

FIG. 2(B) is an illustration of a HMM pattern recognition grouping of states comparing a known pattern against an unknown pattern.

FIG. 3 is a block diagram illustrating the two pointer pipelines, the two arithmetic pipelines, the memories and register files of one embodiment of the present invention.

FIG. 4 illustrates a detailed block diagram of the distance arithmetic pipeline (identical to the best path pipeline), associated memory 30 and the register file of the present invention.

FIG. 5 illustrates a detailed block diagram of the distance arithmetic pipeline and illustrates the circuitry required to process the four addresses of the arithmetic instruction of the present invention.

FIG. 6 illustrates a block diagram of the present invention illustrating the configuration of the pointer pipelines and the arithmetic pipelines of the present invention.

FIG. 7 illustrates a detailed block diagram of one of the two pointer pipelines of the present invention.

FIG. 9 illustrates a detailed flow diagram of one of the arithmetic pipelines of the present invention.

FIG. 10 illustrates a detailed flow diagram of one of the pointer pipelines of the present invention.

DETAILED DESCRIPTION OF THE INVENTION

Figure 8:
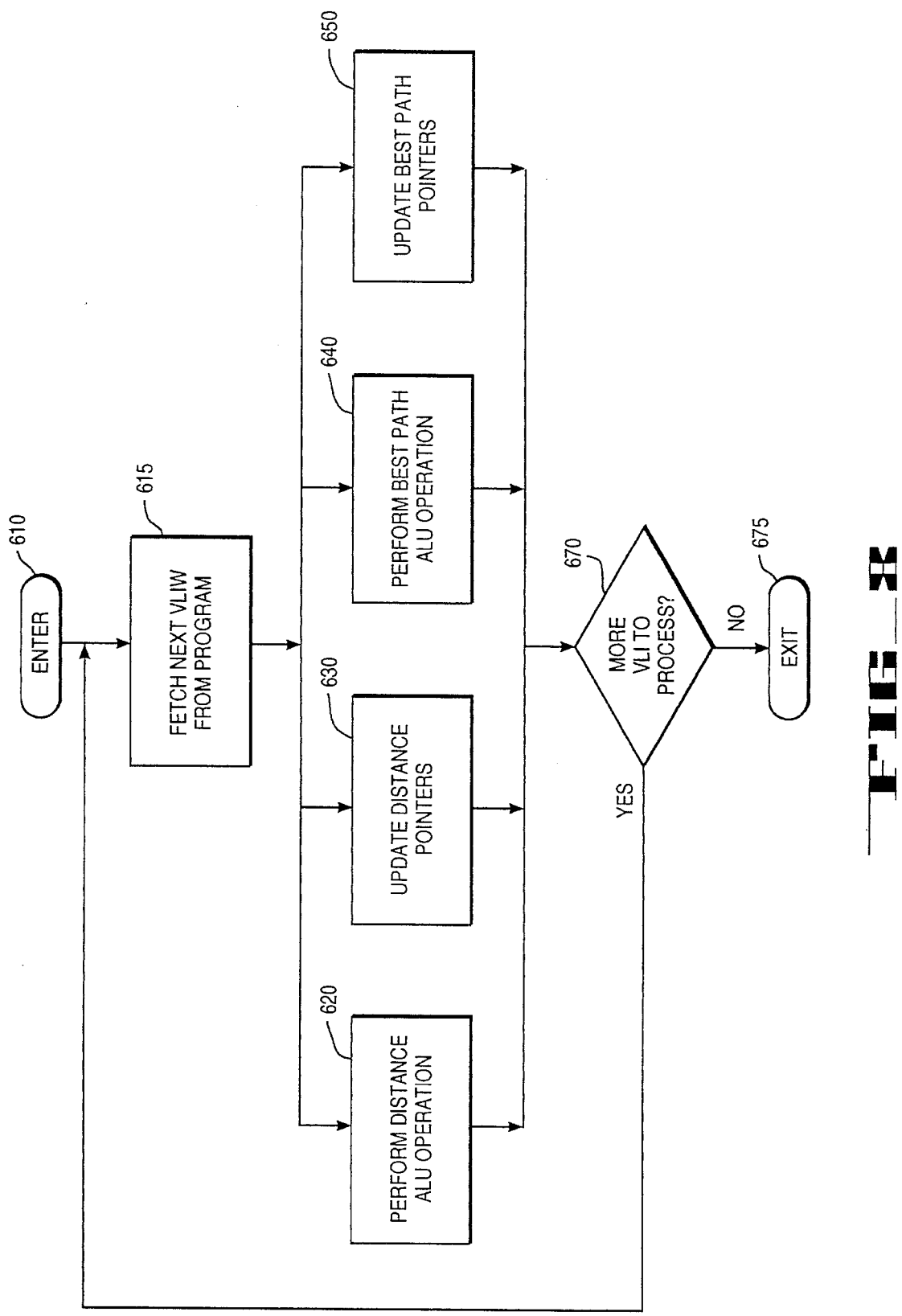
FIG. 8 is an overall flow diagram of the parallel processing states of the arithmetic pipelines and the pointer pipelines of the present invention.
Figure 11:
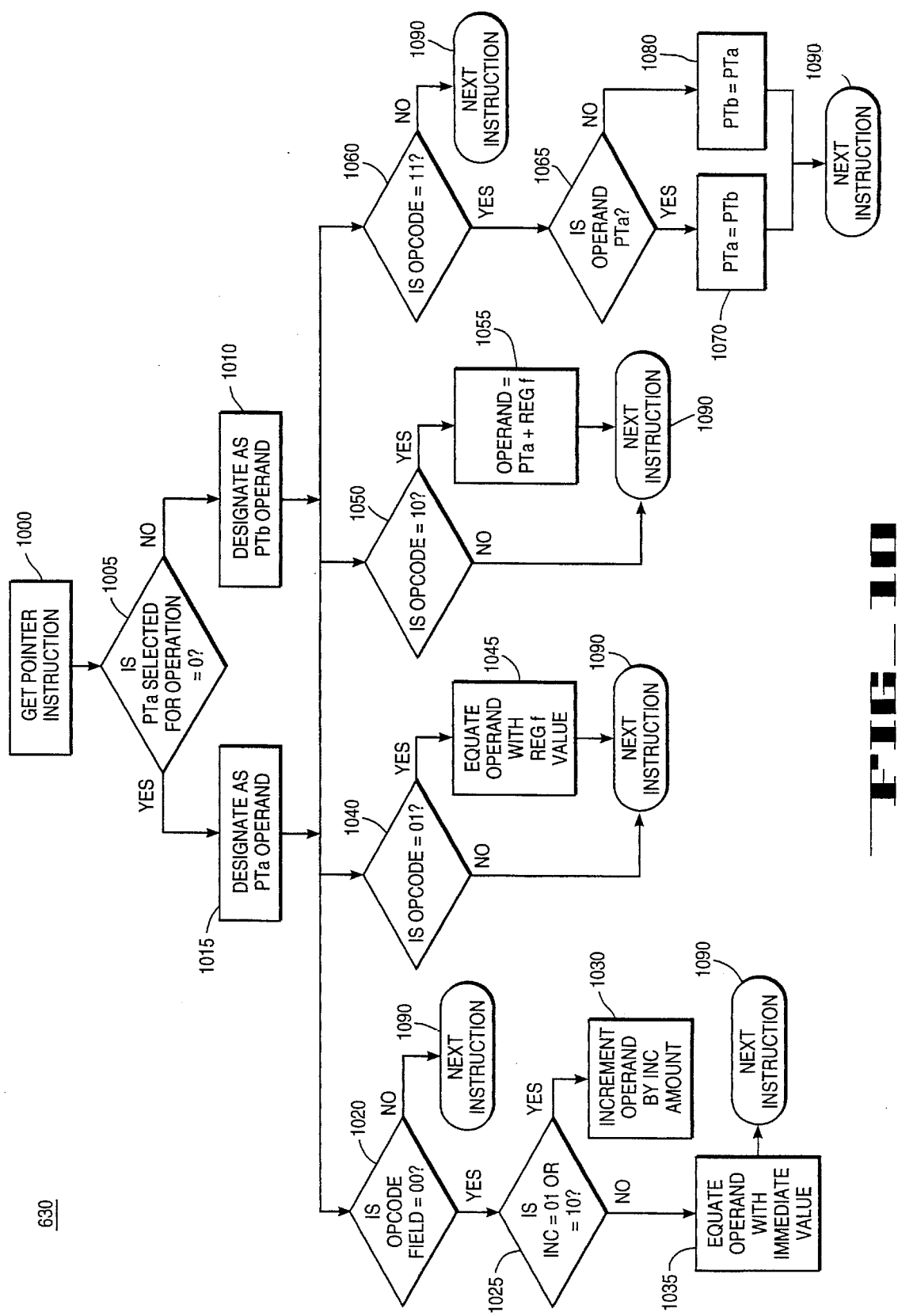

The present invention includes an arithmetic pipeline and pointer pipeline that are capable of executing instructions within one instruction cycle that contain four addresses. Two of the four addresses may be registers and the other two of the addresses may be pointers that reference locations in a memory unit. One of the pointer addresses may be updated during the same instruction cycle in which an arithmetic operator executes. A source and destination field within the instruction dictates which of the addresses is utilized within a given arithmetic operation. The present invention's specially designed and implemented arithmetic integer pipeline is optimized for Hidden Markov Model (HMM) and Dynamic Time Warping (DTW) pattern recognition procedures. The present invention is also coupled with a specially designed pointer pipeline that is capable of processing arithmetic instructions on pointer values in parallel with the arithmetic pipeline processing so that no additional processing time is expended for pointer update instructions. The arithmetic pipeline of the present invention also has the ability to process, within one instruction cycle, an operation involving operands having different lengths (i.e., byte and word formats). The present invention includes complementary instructions for noncommutative operations.

In the following detailed description of the present invention numerous specific details are set forth in order to provide a thorough understanding of the present invention. However, it will be obvious to one skilled in the art that the present invention may be practiced without these specific details. In other instances well known methods, functions, components and procedures have not been described in detail as not to unnecessarily obscure the present invention.

An embodiment of the present invention may be advantageously utilized within a standard computer system having a common system bus 100. Once such typical computer system having a system bus 100 utilizes the well known 5 volt ISA computer bus format. Therefore, reference to a system bus 100 throughout this present discussion may be interpreted as utilizing the ISA standard computer system bus. Referring to FIG. 1, the elements of the preferred embodiment of the present invention reside within a pattern recognition system 525 capable of executing sections of program code shared between the CPU 510 that compare reference patterns against an unknown pattern to locate candidate patterns for match. The overall computer system contains a Central Processing Unit 510 coupled to the bus 100. The system includes Random Access Memories 512 and Read Only Memories 514 for storage of data and program code; these are coupled to the bus 100. An optical or magnetic disk drive or other storage device 516 is coupled to the bus 100 for storage of data and/or program code. A display means 518 is coupled to the bus 100 for display of data for visualization by a computer user. The display may be a standard CRT device, liquid crystal or otherwise containing an analog or digital driven signal. A data input device 520 is coupled to the bus 100 an includes a means for inputting data into the system such as a keyboard, tablet, stylus with associated digitizer, or other pattern data input device. The pattern recognition system (Pattern Engine) 525 is composed of two arithmetic pipelines 38 and 40 as well as two pointer pipelines 34a and 34b as well as on chip memory units, register files and other associated hardware 510 that will be described in greater detail to follow. A private memory 521 (separate from RAM 512) is also associated with the pattern engine 525 for containing reference pattern information and functions as a prototype library.

DTW and HMM Pattern Recognition Procedures

As discussed above, the present invention may be particularly used within the field of pattern recognition of computer systems. Two well known procedures utilized by pattern recognition computer systems are described. These procedures are Dynamic Time Warping and Hidden Markov Model. The present invention is optimized to operate within these procedures in order to render pattern recognition. Therefore, the following is a discussion of some of the processing steps required for DTW and HMM procedures used for pattern recognition. It is appreciated that a full understanding of DTW and/or HMM procedures is not a requirement to understanding the elements of the present invention. In so far as the elements of the DTW and HMM procedures have driven the design of the present invention, these elements are discussed herein. It is noted that for additional background information regarding the well known DTW and HMM procedures used in voice and handwriting recognition, refer to: "An Introduction to Hidden Markov Models," by L. R. Rabiner and B. H. Juang, IEEE ASSP Magazine, January 1986; T. Parsons author of "Voice and Speech Processing," published by McGraw-Hill in 1987; "On line Handwriting Recognition—A Survey," by C. C. Tappert, C. Y. Suen, and T. Wakahara, IEEE, 1988; and C. C. Tappert, "Cursive Script Recognition by Elastic Matching," IBM J. Res. Develop. Vol. 26, No. 6, November 1982.

Regarding FIG. 2(A), there is illustrated a graphical representation of the two axis used in the Dynamic Time Warping (DTW) procedure used for pattern recognition. According to the DTW procedure, there are several reference patterns that are known and are placed into a reference library. One goal of the DTW procedure is to compare an unknown (input) pattern against the reference patterns of the library in order to locate a match between the unknown and the reference patterns. FIG. 2(A) graphically illustrates the DTW procedure applied to one reference pattern against the unknown pattern. It is appreciated that the DTW procedure operates, as will be described herein, for each reference pattern in the library against the unknown pattern. Along the vertical axis are plotted points (from 1 to 9) that comprise a reference pattern that is stored in the reference library within a memory unit of computer system. Along the horizontal axis is plotted points (from 1 to 9) that comprise an unknown pattern that is compared by the computer processing system against the reference pattern. As each point of the unknown is compared against each point of the reference pattern, a lattice or array of points is generated within the two axis.

As each point is compared, a cost function is generated across the lattice that runs from left to right across the lattice. A goal of the DTW procedure is to locate the lowest cost path across the lattice for each reference pattern and compare the paths of each of the reference patterns in order to locate the best matched pattern to the unknown. Each point of the pattern has a given number of features. A classical feature of a point includes the spatial (x, y) coordinates of that point. DTW allows the computer system to locate the best way of distorting the unknown pattern to match the reference pattern at a minimum cost. The cost is called the distance between the unknown pattern and the reference pattern. The reference pattern for which the distance to the unknown is the lowest is the best candidate for a pattern match. The DTW procedure computes the lattice of points using well known Dynamic Programming techniques.

At each point of the lattice, two independent computations need be performed by the present invention. First, a local distance (d), must be computed between the associated point of the unknown pattern verses the reference pattern point. Secondly, the best path to get to the current point from the "neighbor" points must be determined. The two computations are performed in repetition during the DTW procedure. The independence between these two computations is the basic property used by the present invention to accelerate the DTW procedure. For example, the DTW procedure begins at the lower left side of the lattice (at point 6) and calculates upward along the first lattice line until the end point is reached. Within the first vertical lattice line, the first point of the unknown pattern is compared against all of the points of the reference pattern. At the end of the first lattice line the DTW procedure then starts at the second vertical lattice line and compares each of the reference pattern points against the second point of the unknown pattern and so forth down the lattice line. For instance, at point 10, the spatial feature of the fifth point of the unknown is compared against the fifth point of the reference pattern. Basically the (x, y) values associated with each of the points are processed using a distance function in a distance computation. Next, the DTW procedure examines the cost function of associated with each neighbor point to point 10, these would be points 11, 15, and 14 which are some of the possible allowable neighbors in this example of DTW processing. The neighbor with the lowest cost function is then selected, say point 14, and this value is then added to the distance value for point 10. The path of the lowest cost then includes the link point 14 to point 10. As the lattice grows from left to right the lowest cost path will be generated. The operation used in the DTW procedure to determine the best neighbor point is called, in this discussion, the path function.

As can been seen from this discussion a distance computation and a path computation is required for each point of the lattice for DTW processing. Each point of the unknown is compared against each point of the reference pattern generating a multitude of computations.

Hidden Markov Models is another procedure utilized for pattern recognition. In a HMM, a letter, a word or sentence is modeled as a series of transitions from state to state along arcs. Each arc has an associated probability which gives the probability of the transition from one state to the next at the end of an observation frame. A set of probability density functions associated with each state gives the probability of the feature to have the different possible values. The unknown pattern is represented by an ordered set of states (1 to n), similar to those used by DTW. These states are represented along the horizontal axis of FIG. 2(B). The known or reference pattern is also represented as a series of states along a vertical axis. Within each state of the reference is a probability density function that gives the probability that an input state (of the unknown pattern) will match that known state. The Viterbi scoring procedure computes the highest probability that a given set of observation points matches a reference pattern.

FIG. 2(B) illustrated a typical HMM lattice of states. As an example, the HMM procedure first determines the probability that the unknown state 1 will be found within the probability distribution of the first state of the reference pattern; this is a local probability determination. The procedure then computes the probabilities that the unknown state 1 is within each of the states of the test pattern (2 to n) along the first vertical lattice line of FIG. 2(B) starting from the lowest state and sequentially processing lattice points. The second lattice line is then entered representing the second state of the unknown pattern. With reference to point 22, the HMM procedure determines the local probability that state 2 of the unknown is within the probability density function of state 2 of the reference pattern; this is called the local probability of point 22. Then the HMM procedure determines the probability that a transition will occur between point 20 and point 22 (p1), and the probability that a transition will occur between point 26 and point 22 (p2). Points 26 and 20 are the neighbor states of point 22. The HMM then individually multiplies the values of p1 and p2 against the probabilities associated with each point 20 and 26 respectively to determine the highest probability neighbor; this is the best path computation. Once that neighbor is selected, point 22 will adopt as its probability value the probability value of the neighbor (i.e., the neighbor's local probability) multiplied by the transition probability (from that neighbor to point 22) times the local probability of point 22. Again, a highest probability path is formed linking the selected neighbor and the point 22. This continues through the lattice until the highest probability path is located of all the reference patterns in the reference library. Each point of the unknown is compared against each state of the reference pattern.

As can be seen, in the HMM procedure at each lattice point two independent computations are required. First, the local probability for a point to be observed in a state of the reference pattern is computed. Second, the best path to get to that point from the neighbor points must be computed. If the above computations are done on a logarithmic scale, the multiplication operations become addition operations on exponential values. In this case, the above computational operations of the HMM procedure resemble the DTW procedure operations. The present invention takes advantage of this similarity and the fact that the required operations for each lattice point are independent of each other.

Overall System of the Present Invention

With reference to FIG. 3, an overall logical system diagram of the present invention, arithmetic pipelines and pointer pipelines, are illustrated within the environment of the pattern recognition engine 525. The details of the components illustrated in the system diagram will be further described in discussions to follow. There are two identical arithmetic pipelines 38, 40 and two identical pointer pipelines 34a and 34b illustrated. According to the present invention, two data memory units 30 and 32 are utilized. These memory units contain the immediate pattern data of the unknown pattern and reference pattern that will be processed, point by point, by the present invention as well as other lattice information for each processing point within the DTW and HMM procedures. These memory units are RAM units and contain 256 entries by 16 bits wide each, but could actually be selected from any size depending on the specific programming implementation. Both memory units 30 and 32 are coupled to a separate pointer pipeline 34a or 34b which supplies two separate designated pointer pairs (Pta and Ptb) from each pointer pipeline which are used to reference entries of the memory units 30 and 32.

Each pointer pipeline provides the address of operands and results for each data memory separately. Pointer pipeline 34a addresses data memory 30 while pointer pipeline 34b supplies pointers to address data memory 32. The memory units are each associated with a separate arithmetic pipeline; memory unit 30 with arithmetic pipeline 38 and memory unit 32 with arithmetic pipeline 40. Each of the memory units have dual read channels and one write channel. Each memory is able to provide two operands to an associated arithmetic pipeline and write a result from the associated arithmetic pipeline or from a memory transfer every cycle. Therefore, each memory has two data output channels and one data input channel. The data input channel for each memory is multiplexed between a system bus 100, a memory bus 110 and the output of an accumulator of an associated arithmetic pipeline.

More specifically, memory unit 30 has two 16 bit read output channels 35, 44 which are fed to two input channels of arithmetic pipeline 38 to supply two operands to the distance arithmetic pipeline 38. Arithmetic pipeline 38 is a pipeline that can perform, among many other functions, the distance computations that were referred to above with reference to the DTW and HMM procedures. The output of arithmetic pipeline 38 is fed to the write input of memory 30 via line 55 to supply the memory with the result of the arithmetic pipeline's computation or can be written into the register file. One pointer pipeline 34a is also coupled with memory 30 to supply the two pointers (Pta and Ptb) which are coupled to the read address lines of memory 30 and which address the contents of memory 30 to output operands over the output channels coupled to the arithmetic pipeline 38. Pointer, Pta, is input over line 220 and pointer, Ptb, is input over line 225. The system bus 100 and the memory bus 110 are also coupled to the input write channel of memory 30. A general purpose register file 36 is also coupled to one input of the arithmetic pipeline 38 via line 37 in order to deliver the contents of one of the registers (Regf) to the arithmetic pipeline 38 in the form of an operand. The contents of line 37 and 35 are multiplexed into the corresponding arithmetic pipeline input. The output of the arithmetic pipeline 38 is also input to the general purpose register file 36 via line 55 to supply a register designated as Regd. The memory bus 110 is also communicatively coupled with the general purpose register file 36. It is appreciated that according to the present invention, the memory 30 is uniquely coupled to the arithmetic pipeline 38 that can perform the distance computations. Pointers Pta and Ptb control the accessing of memory 30 to output corresponding values over output channels 35 and 44 to supply arithmetic pipeline 38.

Similarly, with reference to FIG. 3, memory 32 is associated with arithmetic pipeline 40. Arithmetic pipeline 40 of the present invention performs the best path computations as described above for the DTW and HMM procedures. The system bus 100, the memory bus 110, and the output of the accumulator of arithmetic pipeline 40 over line 56 are multiplexed into the write input of memory 32. The two read address inputs of memory 32 are coupled to two pointers supplied over lines 53 and 54 from the other pointer pipeline 34b. These pointers are not the same pointers that index memory 30 since they are generated by different pointer pipelines. A read channel output 39 is coupled to an input of the arithmetic pipeline 40. The other read channel output 42 is coupled to the other arithmetic pipeline 40 input and multiplexed with an input line 41 that coupled with the general register file 56. It should be noted that the pointer values associated with both line 220 and 225 are multiplexed to the write address channels of the memories 30 and pointer values 53 and 54 are multiplexed to the write address channels of memory 32.

According to the overall system diagram of the present invention as shown in FIG. 3, there are two arithmetic pipelines, one arithmetic pipeline 38 for computing the distance functions and one arithmetic pipeline 40 for computing the best path. The distance pipeline, or arithmetic pipeline 38, receives operands from the data memory 30 or from the general purpose register file 36 (as Regf) and writes results in the memory 30 or into the general purpose register file into the register identified as Regd. The best path pipeline, arithmetic pipeline 40, receives operands from data memory 32 or the general purpose register file 36 and writes results into memory 32 or into the general purpose register file 36. Although the two arithmetic pipelines work with different memory units, they can exchange data through the common general purpose register file 36. Within the register file 36, there are 16 general purpose registers that are 16-bits wide each. Addresses of operands or results to be read out or written into the data memories 30, 32 are provided by the pointer pipelines 34a and 34b respectively. The register file 36 has four ports, two read ports 37 and 36 and two write ports 55 and 56. The register file of the present invention is able to provide one operand to each arithmetic pipeline every cycle and is able to write a result from each arithmetic pipeline operation every cycle.

It is appreciated that each of the two arithmetic pipelines operates in parallel to perform the above computations simultaneously. It is also appreciated that the pointer values supplied by the pointer pipeline 34a and 34b are also updated during the same time as the arithmetic pipelines are performing their calculations. The present invention provides a system whereby in the same instruction cycle that the arithmetic pipelines are calculating their respective results, a pointer pipeline associated with each arithmetic pipeline is preparing the pointer values Pta, Ptb for the next computation (instruction cycle) so that there is no processing delay associated with the pointer update function.

It is appreciated that since the two arithmetic pipelines 38, 40 are identical and also that the two pointer pipelines 34a and 34b are identical, only one set of arithmetic pipeline 38 (the distance pipeline) and associated pointer pipeline 34a will be described in detail herein. It is appreciated that the other set, arithmetic pipeline 40 (the best path pipeline) and pointer pipeline 34b is analogous. It is appreciated that the general purpose register file 36 is common between both of the above sets.

Instruction Formatting of the Present Invention

The present invention utilizes a specialized instruction coding scheme that allows the parallel processing capabilities as described above. This encoding scheme uses a Very Long Instruction Word (VLIW) encoding scheme which is illustrated in Table I below. According to the table, long format instructions comprise six separate fields. The first field identifies whether or not the instruction format is long or short. Table I illustrates a long format. The second field is a 15 bit field that contains control instruction information. The third field, ALU1, contains information for the operation of the distance arithmetic pipeline 38 and the fifth field, ALU2, contains information for the operation of the best path arithmetic pipeline 40. The fourth and sixth fields, PT1 and PT2, contain information that is sent to the two pointer pipelines 34a and 34b, respectively, for pointer update. It is appreciated that the two arithmetic pipelines as well as the two pointer pipelines operate in parallel according to these instruction fields of the Very Long Instruction Word format.

TABLE I

| 1 bit | 15 bits | 27 bits | 5 bits | 27 bits | 5 bits |
|---|---|---|---|---|---|
| 1 | Long Control | ALU1 | Pt1 | ALU2 | Pt2 |

According to Table I, the fourth field corresponds to the instruction field for pointer pipeline 34a. This five bit field controls the pointer pipeline used by the distance arithmetic pipeline 38 of the present invention and contains a pointer instruction or operation. The sixth and last field corresponds to the instruction field for pointer pipeline 34b. This five bit field controls the pointer pipeline used by the best path arithmetic pipeline 40 of the present invention and contains a pointer instruction or operation. It is appreciated that each pointer instruction field also uses the contents of the associated arithmetic pipeline instruction field in order to obtain pointer information.

Table II illustrates in detail the fields available for each 27 bit arithmetic instruction field. As shown there are four different instruction formats available for each arithmetic pipeline of the present invention. For the sake of discussion, it is assumed that Table II illustrates the breakdown of the fields associated the distance arithmetic pipeline 38 and pointer pipeline 34a. However, the discussion equally applies to the best path arithmetic pipeline 40 except that each pipeline utilizes a different and associated pointer pipeline. As Table II illustrates the arithmetic instructions are 4 address instructions. An arithmetic instruction specifies addresses of two pointer registers and addresses of two general purpose registers. Which registers are used as sources or source addresses and which registers are used as destination or destination addresses is specified in a 5 bit field called the type, or, more specifically, source type and destination type. The operation performed between the sources is called the opcode. The accumulator may also be a source and it is appreciated that the accumulator always holds the result of the previous arithmetic instruction.

TABLE II

| 6 bits | 1 bit | 4 bits | 4 bits | 4 bits | 4 bits | 4 bits |
|---|---|---|---|---|---|---|
| Opcode | Destination type | Source Type | Ptb | Pta | Regf | Regd |
| Opcode | 1 (*Ptb) | 0x11 *Pta op Imm | Ptb | Pta | 8 bit immediate | |
| Opcode | 0 (Regd) | 1111 Regf op Imm | 8 bit immediate | | Regf | Regd |
| nop or ldimm | 0 (Regd) | 16-bit immediate | | | | Regd |

The above Table II illustrates that the arithmetic pipeline of the present invention may adopt one of four different formats. The first format will be discussed in detail herein. According to the first format, the first six bits of the instruction represent the opcode or operation for the particular instruction cycle. A listing of the available operations that may be performed by each arithmetic pipeline the present invention is presented in Table V. The ALU opcode is typically an arithmetic operation to be performed by the arithmetic pipeline. The next bit indicates where the destination will be for the result of the operation. This destination may be the designated register, Regd, of the general purpose register file 36 or may be an address within the data memory 30 as pointed to by the designated pointer, Ptb. The next four bits indicate the source type of the present instruction which indicates from where the sources of the opcode will be taken. This will be described in detail to follow. The next four bits (the fourth field) indicate which pointer of the 16 pointers of the pointer file associated with arithmetic pipeline 38 will be designated as pointer Ptb. The next four bits (the fifth field) indicate which pointer of the 16 pointers of the pointer file associated with arithmetic pipeline 38 will be designated as pointer Pta. The following four bits indicate which register of the 16 registers of the general purpose register file 36 will be designated as Regf. The following four bits indicate which register of the 16 registers of the general purpose register file 36 will be designated as Regd.

It is appreciated that this first format of the arithmetic instruction contains four addresses of four different sources. Depending on the status of the source type field, these four addresses may be utilized in order to gather the operands for the designated opcode or to route the result of the opcode to a proper destination. It is appreciated that since pointer pipeline 34a operates in parallel with arithmetic pipeline 38 and may designate pointers for a pointer instruction, up to four separate addresses may be utilized and updated within a single instruction. This format allows a large degree of flexibility for the instructions of the arithmetic pipelines of the present invention. According to the second format illustrated in Table II, an 8 bit immediate value can be placed into the last 8 bits of the arithmetic instruction format. In this format, the destination address must be designated as *Ptb which is the address within the memory 30 pointed to by Ptb. In the third format, the 8 bit immediate value is placed in the 8 bits that are usually reserved for the pointer indicators. In this format, the result is predetermined for the register, Regd. Lastly, the fourth format allows for a 16 bit immediate value to be introduced into the arithmetic pipeline. It is appreciated that the type field indicates the addressing mode for the operands and results of the operation specified within the opcode field. Therefore, four addressing modes are provided for the operands: 1) immediate operand mode; 2) register operand mode; 3) pointer indirect mode; and 4) pointer indirect with register offset mode. Register mode and pointer indirect mode are the two only possible addressing modes for results of arithmetic instructions.

Table Ill illustrates how the selection of destination and sources of the arithmetic pipeline are selected depending on the destination and source type fields.

TABLE III

| Destination Type (1 bit) | Source 1 Type (2 bits) | Source 2 Type (2 bits) |
|---|---|---|
| 0 Regd | 00 *Pta (byte) | 00 *Ptb (byte) |
| 1 *Ptb | 01 *Pta (word) | 01 *Ptb (word) |
|  | 10 *(Pta + Regf) | 10 Accumulator |
|  | 11 Regf | 11 Immediate |

According to Table III, when the destination field of the arithmetic instruction format is 0, the result of the arithmetic pipeline will be loaded from the accumulator into the register indicated as Regd. Otherwise, the result will be loaded into the memory 30 at a location indicated by pointer, Ptb. The first two bits of the source type refer to the first source location for the arithmetic pipeline 38. If the first two bits of the source type are 00 then the first source will be indirectly addressed from pointer, Pta, from the memory 30 in a 8 bit format. If the first two bits of the source type are 01 then the first source will be indirectly addressed from pointer, Pta, from the memory 30 in a 16 bit word format. If the first two bits of the source type are 10 then the first source will be indirectly addressed from pointer, Pta, and offset by the value of Regf from the memory 30 in a 16 bit word format. If the first two bits of the source type are 11 then the first source will be taken as the value within Regf, a direct access, in a 16 bit word format.

Referring still to Table III, the second two bits of the source field indicate the location of the second source of the arithmetic pipeline 38. If the second two bits are 00 then the second source will be obtained via indirect addressing according to the value of pointer, Ptb, and the memory 30 will deliver a byte format. If the second two bits are 01 then the second source will be obtained via indirect addressing according to the value of pointer, Ptb, and the memory 30 will deliver a word format. If the second two bits of the source type field are 10 then the second source will come from the accumulator of the arithmetic pipeline 38. If the second two bits of the source type are 11 then the second source of the arithmetic pipeline will come from the immediate value found in the arithmetic instruction format of Table II. Table III illustrates that the present invention arithmetic pipeline offers a rich addressing scheme of four possible operand addresses for each arithmetic instruction opcode.

Distance Arithmetic Pipeline 38 of the Present Invention

Given the addressing schemes of the present invention as described above and the instruction formats, a discussion of the hardware components that realize elements of the present invention will now be discussed. With reference now to FIG. 4, there is illustrated a more detailed diagram of the distance arithmetic pipeline 38 (dashed lines) that performs the distance calculations of the HMM and DTW procedures. The best path arithmetic pipeline 40 is identical to this pipeline. FIG. 4 also illustrates the general purpose register file 36 and the associated data memory 30 that are used with the arithmetic pipeline 38. It is appreciated that with reference to the arithmetic pipeline 40, it will exchange information with memory 32 which is addressed by pointer pipeline 34a but will address the general purpose register file which is common to both arithmetic pipelines.

Data memory 30 is shown in FIG. 4. The write data port 30b of memory 30 is coupled to a register (latch) 91 which receives data input from a multiplexer 93 over three sources. It receives input from the system bus 100, from a memory bus 110 or from the output of the arithmetic pipeline 38. The single write address port 30a of memory 30 receives an input from register (latch) 83 which receives an input from multiplexer 80. Addresses from the memory bus 110 or from the designated pointer, Ptb, can be multiplexed into the latch 83. The pointer, Ptb, originates from the pointer pipeline 34a. The first read address port 30c of the memory 30 is coupled to a register (latch) 84 which receives its input from multiplexer 82. Multiplexer 82 receives address inputs from designated pointer, Ptb, and from the memory bus 110. The second read address port 30d receives input from logic unit block 85 which receives two inputs. One input is the designated pointer, Pta, and the other input is the designated register, Regf. The first read address port is associated with the first read data output port 35 and the second read address port is associated with the second read data output port 44 of the memory 30. It is noted that an output from channel 44 is also fed to the memory bus 110.

The two read data output channels 35 and 44 supply two operands to the arithmetic pipeline 38. The read data output channel 35 of the present invention is a sixteen bit line and is fed into a eight bit multiplexer (not shown here) and then fed into a sign extension block 61 of the arithmetic pipeline 38. Similarly, the read data output channel 44 is a sixteen bit line and is fed into a eight bit multiplexer (not shown here) and fed into a sign extension block 62 of the arithmetic pipeline 38. The sign extension logic blocks 61 and 62 are coupled to an input line of each multiplexer 64 and 66 respectively. Each sixteen bit data channel 35 and 44 is also directly coupled to the inputs of multiplexers 64 and 66 respectively. Also coupled to an input of multiplexer 64 and 66 is the accumulator 74. The output of the register file 36 is also fed into an input of multiplexer 64 via line 37 and a bypass circuit; this carries the designated Regf value. Coupled to the input of multiplexer 66 is line 86 which carries an immediate value. Multiplexer 64 is selected via the first two bits of the source type field and multiplexer 66 is selected via the last two bits of the source type field associated with arithmetic pipeline 38. Multiplexer 64 therefore selects the location for the first source which is loaded into register (latch) 68 while multiplexer 66 selects the location for the second source which is loaded into register (latch) 69. The reason the accumulator is fed into the first source, even though no accumulator location is allowed according to Table III, is because when a designated Regf is a register that was previously the value of the accumulator in the just previous instruction, the present invention will input the accumulator value as Regf instead of accessing the register file 36. This is an implementation choice selected by the present invention for efficiency and is transparent to a programmer of the arithmetic pipeline 38.

The arithmetic pipeline 38 of FIG. 4 of the present invention for the distance arithmetic pipeline contains four operators within a logical operator unit 70. Although the present invention may operate using a variety of operators, the preferred embodiment of the present invention includes a barrel shifter 70a, and adder and subtractor 70b, an ALU (arithmetic/logic) unit 70c which may also perform subtraction operations, and a pass operator 70d which is a multiplexing element between the first and second sources. Each of the above four operators are coupled to both sources 68 and 69 to receive the two operands. Each of the operators are also coupled to a multiplexer 72 which channels the results to an accumulator. Depending on the operation selected, the multiplexer 72 channels the proper result to the accumulator latch 74. All of the arithmetic operations are done with 16 bit operands and results. The accumulator is also fed via line 55 to a bypass circuit into multiplexer 66 and to a bypass circuit that may substitute for Regf, however, these features are not pertinent to the present invention. Further, the accumulator output is fed into one input of multiplexer 76 along with the memory bus 110 and the system bus 100. None of these other inputs aside from the accumulator are pertinent to the present invention. The output of the multiplexer 76 is then fed via line 90 to the 16 bit general register file 36 into the register designated as Regd by the arithmetic instruction format shown in Table II.

According to the diagram of FIG. 4, the present invention arithmetic pipeline 38 may have two possible source locations; one operand may come from the general purpose register file and an operand may come from the data memory 30 accessed by a pointer from the pointer pipeline 34a. Also, there are two possible destinations for a particular arithmetic instruction format; one possible destination may be to store the result into the register file 36 or to store the result into the data memory 30. Multiplexers 64, 66, 72, 76 and 93 are used to perform the specific routing to realize the source and destination types indicated by the instruction formats of Table II of the present invention.

Referring now to FIG. 5, the present invention arithmetic pipeline is disclosed in more detail. The memory unit 30 of the present invention is divided into 256 entries of 16 bits each entry and each entry is also divided into two bytes. Therefore, there are 512 byte entries within the memory 30, the same is true for memory 32. Table III allows both byte and word accesses from the memory 30 via the pointers *Pta and *Ptb (indirect accessing used here). Depending on the source type, the arithmetic pipeline will process the output of the memory 30 as word data or as byte data. It is appreciated that each of the read address ports 30d and 30c of the memory 30 input an eight bit address value in order to access the memory. This is the case because the output channels 34 and 44 are sixteen bits long and there are 256 entries. However, for byte accessing there must be another bit added so that an individual byte within an accessed word can be selected. This ninth bit is the least significant bit of the address value supplied by the pointer values, Pta and Ptb, and is separated from the address that enters port 30d and port 30c. The LSB bit from pointer, Pta, is carried via line 165 to a high/low selector input of multiplexer 101. The LSB bit from pointer Ptb, is carried via line 166 to a high flow selector input of multiplexer 102. The manner in which the present invention utilizes these bits will be developed in discussions to follow further below. It is appreciated that all reference to pointers Pta and Ptb refer to the pointer that originate from the pointer pipeline 34a.

Since Table III only allows pointer Ptb or Regd to be a destination address, the write address into port 30a of memory 30 is Ptb from the pointer pipeline 34a. Data for the write channel 30b, as discussed before, may originate from the accumulator via line 55 or may come from another system component over the system bus 100 or memory bus 110. The first read address channel 30d originates from multiplexer 124 which is controlled by select line 150. Select line 150 carries the first two bits of the source type of the arithmetic pipeline 38 instruction format of Table III. If line 150 selects '00' or '01' then the multiplexer allows the pointer data of Pta to pass to port 30d. If the select line 150 selects '10' then the multiplexer 124 will couple the line 120 to channel 30d. Line 120 is output from a logical adder 122 that adds the values of the designated Regf to the value of pointer Pta and outputs the result over line 120. In all cases the pointer value, Ptb, is fed to the input of read address channel 30c during HMM or DTW processing of the present invention. Also Ptb and Pta are fed to channels 30a and 30d, respectively, during HMM and DTW processing.

The data read output channel 35 is 16 bits wide and will carry the high and low bytes of the word address by the signal at line 30d. This line 35 is separated into a high byte line having 8 bits and a low byte line having 8 bits and each of these are fed into a multiplexer 101. Multiplexer 101 will select either the high byte line or the low byte line of the addressed word depending on the value of line 165 which is the ninth and least significant bit of the designated pointer, Pta, or the summation of Pta and Regf. If line 165 is low, the low byte is selected and if line 165 is high then the high byte is selected and routed to the sign or zero extension block 61.

Line 155 originates from the instruction opcode field of Table II. This field will indicate if sign extension is required by the nature of the opcode. If sign extension is required then the selected byte from line 35 and the multiplexer 101 will be placed into a 16 bit register in the least significant byte position. The most significant byte of the 16 bit register will be all set to "1" by block 61 of the present invention if the sign bit of the selected byte is a "1." However, the most significant byte of the 16 bit register will be all set to "0" by block 61 if the sign bit of the selected byte is a "0." This block 61 can transform a signed byte (8-bits) into a signed word (16-bits) if the opcode of the current arithmetic instruction indicates that a sign operation is required.

The 16 bit register result of the sign/zero extension block 61 is fed into one input of a multiplexer 64. The 16 bit data read channel 35 is also fed into an input of multiplexer 64. Lastly, the value of the designated register, Regf, is fed into an input of multiplexer 64. Multiplexer 64 is selected according to line 150. If line 150 selects '00' then the output of block 61 is channeled into the first source register 68. If line 150 selects '01' or '10' the multiplexer 64 selects the read data channel 35 to be coupled to the first source register 68. Lastly, if line 150 selects '11' then line 37 is coupled to the first source register 68.

Referring still to FIG. 5, the second read data channel 44 outputs a 16 bit value which is separated into two 8 bit lines, a high byte and a low byte and each of these are fed into a multiplexer 102. Multiplexer 101 will select either the high byte or the low byte of the addressed word depending on the value of line 166 which is the ninth and least significant bit of the designated pointer, Ptb. If line 166 is low, the low byte is selected and if line 166 is high then the high byte is selected and routed to the second sign or zero extension block 62. The multiplexer is selected by line 155. Line 155 originates from the instruction opcode field of Table II. This field will indicate if sign extension is required by the nature of the opcode. If sign extension is required, then the selected byte from line 44 and the multiplexer 102 will be placed into a 16 bit register within block 62 in the least significant byte position and the most significant byte of the 16 bit register will be all set to "1" by block 62 of the present invention if the sign bit of the selected byte is a "1." However, the most significant byte of the 16 bit register will be all set to "0" by block 62 if the sign bit of the selected byte is a "0." This block 62 can transform a signed byte (8-bits) into a signed word (16-bits) if the opcode of the current arithmetic instruction indicates that a sign operation is in order. The 16 bit register of block 62 is then output to an input of multiplexer 66.

Referring to FIG. 5, multiplexer 66 receives an input from block 62. It also receives an input directly from channel line 44. It receives an input from the accumulator of arithmetic pipeline 38 over line 55. Lastly, multiplexer 66 receives an input from line 86 which is the immediate data value of the arithmetic instruction format. All of the inputs to multiplexer 66 are 16 bit in length. Line 152 is fed as the select line for multiplexer 66 and represents the last two bits of the select type of Table III. If line 152 selects '00' then the input from the block 62 coupled to the second source register 69. If line 152 selects '01' then line 44 is coupled to register 69. If line 152 selects '10' then line 55 is coupled to the register 69 to bring the accumulator value to the second source and if line 152 selects '11' then line 86 is coupled to place the immediate value into register 69. The output of the first source register 68 and the second source register are fed to the operator unit 70 which contains the barrel shifter operator, the adder/subtracter operator, the ALU operator, and the pass operator. The multiplexed result of the operator unit 70 is then routed into an accumulator register 74 which is coupled to line 55 and also fed into a multiplexer 76 which supplies the result to the register file 36 as designated register, Regd. The system bus is also coupled to the multiplexer 76.

The destination type bit of the arithmetic instruction format of Table III effects the placement of the result of the arithmetic pipeline 38. When the destination is selected as the designated register Regd (i.e., the bit is 0) then the write enable 173 of the general purpose register file 36 allows the arithmetic pipeline result to be stored into the addressed Regd. When the destination type is selected for the indirect addressing pointer, *Ptb, (i.e., bit is 1) then the write enable is asserted onto memory 30 which is addressed by pointer Ptb via port 30a and the result is supplied via line 55 and the multiplexer 93. It is noted that multiplexer 93 selects line 55 or line 100 (with reference to FIG. 4) as an input during HMM and DTW point processing.

It is appreciated that a common multiplier unit (not shown) exists and is common to both the distance and best path arithmetic pipelines and may perform multiplier functions within arithmetic instructions on selected source operands while multiplexing the result within the appropriate accumulator.

Therefore, according to the above discussions the present invention arithmetic pipeline realizes in circuitry the addressing modes illustrated in Table I, Table II, and Table III. It is appreciated that all of the discussions with regard to FIG. 4 and FIG. 5 apply analogously to identical arithmetic pipeline 40. However, pointers Pta and Ptb originate from pointer pipeline 34b for the arithmetic pipeline 40 and the memory unit associated with arithmetic pipeline 40 is memory 32. Further, while the distance arithmetic pipeline 38 utilizes the first arithmetic instruction field (27 bits) of Table I, the best path arithmetic pipeline 40 utilizes the second arithmetic instruction field (27 bits) of Table I.

Pointer Pipeline 35a of the Present Invention

FIG. 6 is a logical block diagram and illustrates the elements of one embodiment of the present invention in more detail concerning the interface of the arithmetic pipelines and the pointer pipelines. The two arithmetic pipelines 38 and 40 are illustrated coupled to memory units 30 and 32 respectively and also coupled to the general purpose register file 36. Pointer pipeline 34b is illustrated coupled to memory unit 32. The distance pointer pipeline 34a is illustrated in more detail. Within the pipeline architecture 38 is located a pointer register file 200 that contains 8 registers that are 16 bits wide each. This register file is coupled to a pointer operator 205 which is a logical unit that can perform operations on the pointers, Pta and Ptb. The designated pointers, Pta and Ptb are output over lines 220 and 225, respectively, which are coupled to memory 30 and also coupled to the pointer operator 205. The result of the pointer operator is fed back into the pointer register 200. Also, Regf is supplied to the pointer register file 200 via line 37 from the register file 36.

Given this overall system diagram, it is appreciated that the architecture and instruction coding for pointer pipeline 34b is identical to the pointer pipeline 34a (except pipeline 34a addresses memory 30 while pipeline 34b addresses memory 32) and therefore is not described in detail as to not unnecessarily obscure the present invention. It is appreciated that the pointer pipeline 34b contains its own pointer register file and does not utilize the register file 200 of pointer pipeline 34a. Since each arithmetic pipeline has a corresponding pointer pipeline counterpart, during the processing cycle wherein an arithmetic pipeline is performing a point computation, the associated pointer pipeline will be updating the pointer information so that upon the immediate next processing cycle the arithmetic pipeline may process the next valid point of the lattice without a pointer update delay.

In so doing the processing required to update the pointers takes no additional processing time. The present invention therefore offers an extremely efficient and rapid processing scheme that may be especially useful in pattern recognition procedures. It is appreciated that the arithmetic pipeline 38 may operate utilizing one address or two addresses as a source for source1, one address as a source for source2, one address as a destination while the pointer pipeline 34a may simultaneously operate on another, fourth address to perform pointer updating functions. Therefore, within one instruction the present invention allows simultaneous processing of four addresses and two arithmetic functions, one function being computed by the arithmetic pipeline and the other being computed by the pointer pipeline.

Refer now to FIG. 7 which illustrates in more detail a pointer pipeline (34a or 34b) of the present invention. Each pointer pipeline has two adders to compute (pointer+some increment) and (pointer+Register Regf). All pointer operations are 16 bit operations. Write data enters pointer register file 200 via write data port 261. This data is loaded into register 246 via a number of sources. Pointer data may originate from the system bus 100, or from the memory bus 110. However, none of these sources are directly pertinent to the present invention. Pointer data may arrive from the designated register, Regf via line 37. Data also may enter the write port 261 via the output of adder 250 or from the output of adder 255. Depending on the particular pointer instruction opcode designated in the pointer field (field 4 or field 6) of Table I, a particular source of the above will be multiplexed (via a first pointer multiplexer) into register 246 and input to the write port 261 of the present invention. The write address port 262 of the pointer file receives the pointer address via register 240 which multiplexes inputs from the memory bus 110 and from the currently designated pointers, Pta and Ptb. The value input to port 262 will be the address of the designated pointer within the pointer file 200. There are 8 pointers within each pointer file of the present invention, therefore, there are 16 unique pointer addresses for Pta or Ptb.

It is appreciated that the output of block 255 from each pointer pipeline may be directly supplied to an arithmetic pipeline over line 220. In this case, references to simply pointer, Pta, would also include the result of Pta plus the value of register, Regf. This selection may be obtained via a multiplexer block (not shown).

According to the present invention, the pointer file 200 of the present invention contains two read address ports 263 and 264 and two read data output ports 265 and 266 respectively. The read address port 263 inputs the address of designated pointer Ptb via register 242. Pointer address for Ptb is supplied via the arithmetic instruction field of Table II. The pointer value for pointer Ptb is then output over read output data port 265. The read address port 264 inputs the address of designated pointer Pta via register 244. Pointer address for Pta is supplied via the arithmetic instruction field of Table II. The pointer value for pointer Pta is then output over read output data port 266. It is appreciated that both pointers, Pta and Ptb, may be accessed via the pointer register file 200 simultaneously.

Refer to FIG. 7. Both output ports 266 and 265 are routed to the data input port 261 for pointer swap capabilities. The outputs of port 266 and port 265 are multiplexed into a first input of adder 250. The other, second, input of adder 250 receives data from register 248. Register 248 receives data from the increment field of the pointer instruction (which will be described below in Table IV) and this value is zero extended. Depending on the status of the pointer instruction, a different data channel 266 or 265 will be coupled to adder 250 via the first input. Adder 250 outputs a result which is multiplexed with an 8 bit immediate value from the arithmetic instruction. This multiplexed result is then fed to an input port of the first pointer multiplexer which supplies data to the register 246. Using the adder 250 and the multiplexed values from the ALU immediate field, the present invention allows the pointer pipeline to perform the operations of incrementing a pointer value or assigning a pointer value with an immediate value from the arithmetic instruction field (Table II).

The output of port 266 is fed into the first input of adder 255 and then is output via line 220 as the current value of designated pointer, Pta, which is used to address memory 30 for the distance arithmetic pipeline 38. The output port 265 is output via line 225 as the current value of the designated pointer, Ptb, which is used to address memory 30 of the distance arithmetic pipeline. Line 37 carries the value of the designated register, Regf, into the second input of adder 255. The result of adder 255 is then routed to the first pointer multiplexer and to register 246. Adder 225 allows the pointer pipeline of the present invention to realize the pointer, Pta, plus register, Regf, operation which may be fed back into register 246 depending on the status of the current pointer instruction.

Table IV below illustrates the detailed decoding scheme of each of the 5 bit pointer instruction fields of Table I. As noted, there are two pointer instructions in Table I, one for each of the two pointer pipelines. The first field of Table IV is a one bit field that indicates which designated pointer, Pta or Ptb, is involved in the pipeline operation. This will determine which of the pointer values, Pta or Ptb, are fed to the adder 250 or routed to register 240 for write addressing. The second field, the 2 bit opcode field, indicates the type of instruction to be executed by the pointer pipelines. The last field, the 2 bit increment field, indicates the increment type designated in the opcode field. If the opcode field is '00' and the increment field is a '00' then no operation takes place and the values of the pointers within the register file 200 remain constant during the instruction cycle. If the opcode field is '00' and the increment field is '01' or '10' then either designated pointer Pta or Ptb (depending on the status of the first field) will be incremented by 1 or 2 respectively and stored back into the pointer register file. This realizes the instruction Pta=Pta+1 or+2 and Ptb=Ptb+1 or+2. In this case the output of adder 250 is channeled into register 246. If the increment field is '11' and the opcode field is '00' then the immediate value indicated by the arithmetic instruction (Table II) is placed into the pointer register indicated by the first field (i.e., either Pta or Ptb). This realizes the instruction Pta or Ptb—immediate. In this case the output of adder 250 is channeled to register 246.

According to Table IV, if the opcode field indicates '01' then either Pta or Ptb is assigned the value associated with the register, Regf. In this case line 37 is channeled to register 246. If the opcode field is '10' then the pointer Pta is added to value contained within register Regf. This realizes the operation Pta=Pta+Regf. In this case the output of adder 255 is channeled into register 246. According to the last two cases, when the opcode field is '11' and the first field indicates 0 then Pta=Ptb and Pta is the source write address while the Ptb value is channeled to port 261. When the opcode field is '11' and the first field indicates 1 then Ptb=Pta and Ptb is the source write address while the Pta value is channeled to port 261 to perform the swap operation. According to the above discussion, the pointer pipeline has the capability to perform several basic operations on the pointer values concurrently with the arithmetic pipeline processing. It is appreciated that the pointer register file 200 contains 8 registers of 16 bit width. The arithmetic instruction format of Table II indicates which of these 8 registers will be Pta and Ptb associated with the pipeline 34a. Once these are defined, the associated pipeline instruction format of Table IV determines the operations performed on these registers.

TABLE IV

| Which 1 bit | Opcode 2 bits | Inc 2 bits | Flags |
|---|---|---|---|
| 0 | 00 Nop | 00 | |
| 1 Pta | 00 Pt + Inc | 01 Inc=1 | ZP,CP |
| 0 Ptb | 00 pt + Inc | 10 Inc=2 | ZP,CP |
| | 00 Imm | 11 | |
| | 01 Regf | 00 | ZP,CP=0 |
| | 10 Pta + Regf | 00 | ZP,CP |
| 0 | 11 Ptb | 00 | |
| 1 | 11 Pta | 00 | |

It is appreciated that one pointer instruction is attached to each arithmetic instruction. It operates on one of the pointer registers specified in the corresponding arithmetic instruction: Pta, or Ptb, as defined by the first field pointer bit. Pointers can be incremented (used when accessing successive data in an array of memory 30), loaded with the contents of a general purpose register, loaded with an immediate value, or added to the contents of a general purpose register. Pta can be loaded with the contents of Pta and Ptb can be loaded with the contents of Pta. As can be seen, the pointer pipelines 34a and 34b provide the addresses of operands and results of the data memories 30 and 32. There are two pointer pipelines, one for each data memory. The pointer pipelines execute arithmetic instructions on the pointers, Pta and Ptb. Each pointer pipeline is capable of delivering two pointers (Pta and Ptb) to an associated data memory every instruction cycle, and also capable of executing one operation on one pointer every instruction cycle. The register file 200 of the pointer pipeline 34a associated with the memory 30 holds pointers 0 to 7 while the register file associated with the pointer pipeline 34b for data memory 32 holds pointers 8 to 15. Pointers 0 to 7 cannot be used to address the memory 32 while pointers 8 to 15 are not used to address memory 30.

It is appreciated that in view of the addressing available for the arithmetic pipeline and that the pointer pipeline allows operations on a selected pointer that may also include a register offset, the present invention provides an instruction capable of four addresses. The above is allowed per instruction cycle. A possible use of the above system would be to perform an operation on a first source from *(Pta+ Regf) and a second source from *Ptb, then place the result into Regd and at the same time increment Pta. The above can be accomplished within one instruction cycle in a single instruction format using an arithmetic pipeline and a pointer pipeline. It is clear that four addresses were simultaneously utilized, two registers and two pointers. Since the present invention offers two pairs of arithmetic and pointer pipelines, the above function can in reality be accomplished twice, once by each pipeline pair.

Logical Operational Flow of the Present Invention

FIG. 8 illustrates the overall operational logic flow of the arithmetic pipelines and the pointer pipelines of the present invention. It is appreciated that since the instructions of the present invention are pipelined, stages of sequential VLIW instructions will begin executing before some of the prior instructions have completed. This is the case because different stages of different VLIW instructions may be executed simultaneously using well known pipeline techniques. The following flows illustrate the logical operations of each VLIW instruction as if executed separately, but in reality, it should be borne in mind that the pipeline execution techniques of the present invention allow different stages (that are not interdependent) of sequential instructions to be executed simultaneously.

For a given instruction clock cycle, the flow of FIG. 8 begins at block 610 where the processing is entered from the overall system 525 and the next Very Long Instruction Word is fetched from a program code memory at block 615. This VLIW contains operations for the four pipelines of FIG. 8. Each of the four pipelines operates in parallel to decode and execute the instruction of block 615 during a single instruction clock cycle. Therefore, for N number of instruction clock cycles, the processes of each of the four pipelines will execute N times.

At block 620, the arithmetic pipeline distance pipeline decodes the first arithmetic instruction field and performs any required distance calculations associated with the current pattern point in HMM or DTW processing. At the same time, at block 630, the first pointer pipeline 34a associated with the distance arithmetic pipeline performs the designated instructions held within the first pointer field of the VLIW. At the same time, at block 640, the best path arithmetic pipeline performs any best path computations as indicated within the second ALU field of the VLIW. Also, at the same time, block 650 performs the second pipeline 34b operations of the second pipeline instruction field that is associated with the best path arithmetic pipeline 40. After the above four pipelines begin execution, each flows into block 670 where the pattern recognition code is checked in order to inquire if there are further VLIW to process. If not, then at block 675 this flow is exited. If there are more instructions then the processing returns to block 615 to fetch another VLIW for the next clock cycle. It is appreciated that the present invention, via parallelism of the above four DTW and HMM tailored pipelines, offers tremendous efficiency and power for pattern recognition applications.

FIG. 9 illustrates in more detail the flow of each arithmetic pipeline. For illustration, the flow of block 620, the distance pipeline 38, is illustrated in detail. At block 900 the processing is entered and at block 905 the four address arithmetic instruction field associated with the arithmetic pipeline 38 is retrieved from Table I. Processing then continues simultaneously to perform a variety of status checks. At block 910 the source2 field of the arithmetic instruction (of Table II) is examined and if equal to '00' block 915 is executed where the pointer, Ptb, is utilized to indirectly address a word from the memory 30 via the second read port. Line 166 will determine which byte, either high or low, of this word is selected for zero or sign extension via block 920. After processing, the original byte data will be transformed by the present invention into a word format and sign or zero extended and placed into the source2 register by block 950. If the test at block 910 fails then processing for this test is over. In parallel, the source2 field is also checked by the present invention at block 925 and if equal to '01' then the pointer, Ptb, is used to indirectly address memory 30 to obtain an entire word of data. This word is then directly placed into the load source2 register at block 950. If the test at block 925 fails then processing for this test is over. At block 930 the source2 field is checked and if equal to '10' then block 935 places the result of the arithmetic pipeline 38 accumulator into the source2 register at block 950. If the test at block 930 fails then processing of the present invention for this test is over. At block 940 the source2 field is checked and if equal to '11' then the data held in the immediate field of the instruction is read by block 945 and placed into the source2 register at block 950. If the test at block 940 fails then processing for this test is over. The above processing blocks 910, 925, 930, and 940 are performed in parallel and are accomplished in order to access the proper source for the source2 register 69.

Refer still to FIG. 9. While the above source2 branch is processing, the present invention also performs processing to determine the source of the source1 register 68. Block 975 of the present invention checks if the source1 field of the first arithmetic instruction (of Table II) is equal to '00' and if so will access the memory 30 via the first read port to obtain a word of data. A byte of this word is selected via line 165 (high or low byte) at block 977 and this selected byte is sent to a zero or sign extension operator via block 979. The byte data is then transformed into word format and supplied to the source1 register at block 952. If the test at block 975 fails then the processing for this test ends. At block 980 of the present invention, the source1 field is examined and if equal to '01' the memory 30 will be indirectly accessed via pointer, Pta, by the first read port to obtain a word of data. This word is then directly placed into the source1 register at block 952. If the test at block 980 fails then the processing for this test ends. Processing at block 985 determines whether source1 field is equal to '10' and if so the value of pointer, Pta, is obtained as well as the Regf value from file 36. These two values are added together via adder 122 and the result is used as an address to access memory 30 over the first read port to obtain a word of data. This word is then placed into the source1 register via block 952. If the test at block 985 fails then the processing for this test ends. Processing of the present invention at block 995 compares the source1 field to '11' and if equal will read the value of Regf register from file 36 at block 997 and place this word into the source1 register 68 at block 952. If the test at block 995 fails then the processing for this test ends. By the above processing, the present invention performs blocks 975, 980, 985 and 995 in parallel during a single instruction cycle to arrive at the proper source location for the source1 register 68.

At block 957, the present invention performs the operation specified by the ALU opcode within the arithmetic instruction field on the two operands stored by block 950 and block 952. One or more of the operator units: the barrel shifter 70a, the adder/subtracter 70b, the ALU operator 70c; and the pass operator 70d will be involved in the determination, and input these word operands from the source1 and source2 registers. If the status of the result field of the arithmetic instruction (Table II) as examined by block 960 is equal to '1' then the word result of the operator unit 70 will be placed into the memory location pointed to by pointer, Pta via block 962. If the destination field is '0' then the result of the operation of block 957 will be placed into the designated register Regd. In either case, after the result of the operation is stored the arithmetic pipeline processing of the present invention is complete for the current instruction. At block 970 the next four address arithmetic instruction is prepared and then fetched at block 905 where the entire process continues for a new instruction. It is appreciated that the arithmetic instruction allows four different addresses. It is further appreciated that the present invention arithmetic pipeline allows 27 unique combinations of addressing modes within the arithmetic instruction.

FIG. 10 illustrates a more detailed diagram of the processing 630 of the pointer pipeline 34a associated with the memory 30. It is appreciated that both pointer pipelines are identical. At block 1000 the first pointer instruction field of Table I is accessed. At block 1005 the field indicating which pointer is selected for operation is examined and if the field indicates '0' then at block 1015 Pta is selected as the designated operand pointer otherwise block 1010 selects Ptb as the designated operand pointer. Processing of the present invention then proceeds to block 1020 where the opcode field of the pointer instruction is examined. At block 1020, if the field is equal to '00' then at block 1025 the increment field is examined. If the increment field is equal to '01' or equal to '10' then the designated pointer is incremented by the amount indicated by the increment field, either one or two at block 1030. If the test fails at block 1025 then the currently designated pointer is loaded with the value of the immediate data within the pointer instruction at block 1035 and the pointer pipeline then exits via block 1090. If the test at block 1020 fails then this segment of the processing ends.

At block 1040 the present invention, at the same time as block 1020, checks if the opcode field is equal to '01' and if so equates the currently designated pointer to the value as the designated register Regf from the register file 36 at block 1045 and then exits via common block 1090. If the test at block 1040 fails then this segment of the processing ends. Simultaneously, block 1050 checks if the pointer instruction opcode field is equal to '10' and if so equates the current designated pointer to the value of pointer, Pta, added to the value of designated register, Regf at block 1055 then exits via common block 1090. If the test at block 1050 fails then this segment of the processing ends. At block 1060 the present invention compares the opcode field to '11' and if equal the present invention checks if pointer, Pta, is the designated pointer. If both conditions are true then at block 1070 the present invention loads pointer, Pta, with the value of pointer, Ptb. If the test at block 1065 fails then the present invention equates pointer, Ptb, to the value of pointer, Pta. In either of the above two cases the present invention then exits via common exit block 1090. If the test as block 1060 fails then the processing for this segment ends. It is appreciated that the present invention performs the processing for blocks 1020, 1040, 1050, and 1060 simultaneously. After the current pointer instruction field is executed by the pipeline, the flow returns to gather a new instruction and the processing begin again at block 1000.

It is appreciated that the present invention arithmetic pipeline and pointer pipeline combination allows simultaneous execution, within one instruction, of two operations, one operation on pointer addresses (pointer pipeline) and one operation on data addresses (arithmetic pipeline) thus allowing one instruction to access four addresses.

Asymmetric Source Type Format of the Present Invention

Referring to Table III, the four possible sources or set of addresses for the source1 operand are not symmetric to the four possible sources or address set for the source2 operand. That is, the accumulator and the immediate data are available only to the source2 operand and not to the source1 operand, therefore the sets of sources available for source1 is not equal to the set of sources available to source2. Further, the register Regf source is not available to the source2 but is available to source1. Also, source indexing mode (via Regf) is not available for source2 but is available for source1. This is referred to as source asymmetry within the operands of the arithmetic pipelines. This asymmetry was designed into the present invention to allow greater source addressing flexibility and combinations while also tailoring the addressing combinations of the arithmetic instructions to the DTW and HMM pattern recognition procedures as well possible future versions of these recognition procedures.

In order that such asymmetric addressing capability not pose a limitation to the present invention, the present invention has provided several special complementary instruction pairs for noncommutative operations that allow any of the instruction operands of such operations to come from either source1 or source2 to eliminate the problem posed by address set asymmetry. For example, refer to Table V, which illustrates a listing of the arithmetic pipeline operations that the present invention currently supports. Since subtraction is a noncommutative operation there are two instruction to perform subtraction. Once instruction, opcode=AH, specifies the subtraction of source1–source2. Another complementary instruction, opcode=CH, specifies the subtraction of source2–source1. Therefore, the accumulator, which is available only to the source2 register, may be subtracted from a value (source1–accumulator) or may have a value subtracted from it (accumulator–source1) depending on the instruction selected of the complementary instruction pair. In this way the present invention offers flexibility for the use of the immediate value and accumulator value in spite of the fact that the source addressing is not completely symmetric with respect to the accumulator and immediate value.

Byte or Word Accessing in Memory Without Processing Penalty

An embodiment of the present invention, the arithmetic pipeline, may address either a byte data or a word data item within the same instruction cycle. That is, with reference to FIG. 5, multiplexer 64 and multiplexer 66 may select either the word output from memory 30 or the selected byte output from memory 30 within the same instruction cycle. Each multiplexer is independent and may take a word or a byte input. Also, operations may utilize operands that mix byte and word data within the same instruction clock cycle. For instance source1 may come from *Pta(byte) which is a byte format while source2 may come from the accumulator or from *Ptb(word) and either are word formats. It is appreciated that is advantageous to be able to mix byte and word formats within the same instruction while having the ability to execute that instruction within one clock cycle. The present invention offers the ability to perform an operation involving two byte operands or a byte operand and a word operand or two word operands without any performance degradation between the above types.

TABLE V

| Opcode | Operation | Name | Flags |
| --- | --- | --- | --- |
| 0H | Nop | No operation | |
| 1H | Src1 -Byte- Zero-Ext | First Operand (unsigned byte) | |
| 2H | Src1 -Byte- Sign-Ext | First Operand (signed byte) | |
| 3H | Src1 | First Operand (word) | |
| 4H | Src2-Byte-Zero-Ext | Second Operand (unsigned byte) | |
| 5H | Src2-Byte-Sign-Ext | Second Operand (signed byte) | |
| 6H | Src2 | Second Operand (word) | |
| 7H | Src1 + Src2 | Add | N,Z,C,O |
| 8H | addu Src1 +Src2 | Unsigned Add | Z,C |
| 9H | Src1 +Src2 + CIN | Add with Carry | N,Z,C,O |
| AH | Src1 − Src2 | Sub | N,Z,C,O |
| BH | subu Src1 − Src2 | Unsigned Sub | N,Z,C,O |
| CH | Src2 − Src1 | Reverse Sub | N,Z,C,O |
| DH | subu Src2 −Src1 | Unsigned Reverse Sub | Z,C |
| EH | Src1 − Src 2 − CIN | Sub with Carry | N,Z,C,O |
| FH | Src2 − Src1 CIN | Reverse Sub with Carry | N,Z,C,O |
| 10H | Src1 & Scr2 | Logical And | Z |
| 11H | Src 1 | Src2 | Logical Or | Z |
| 12H | ~Src1 | Logical Not First Operand | Z |
| 13H | ~Src2 | Logical Not Second Operand | Z |
| 14H | Src1   Src2 | Logical Xor | Z |
| 15H | ~(Src1 & Src2) | Logical Nand | Z |
| 16H | Rd = 16 bit immediate | Load Immediate | |
| 17H | Min (Src1, Src2) | Minimum | MM |
| 18H | UMin (Scr1, Src2) | Unsigned Minimum | MM |
| 19H | Max (Src1, Src2) | Maximum | MM |
| 1AH | UMax (Src1, Src2) | Unsigned Maximum | MM |
| 1BH | |Src1 − Src2| | Absolute Value of Difference | N=0,Z,C=0,O |
| 1CH | Src1 >> Src2 | Right Shift | N=0,Z,C |
| 1DH | Src1 << Src2 | Left Shift | N,Z,C |
| 1EH | Src1 Arith >> Src2 | Arithmetic Right Shift | N,Z,C |
| 1FH | Src1 Right Rot Src2 | Right Rotate | N,Z |

TABLE V-continued

| Opcode | Operation | Name | Flags |
|---|---|---|---|
| 20H | Src1 Left Rot Src2 | Left Rotate | N,Z |
| 21H | Src1? Src 2 | Compare | N,Z,C=0,O=0 |
| 22H | UComp Src1?Scr2 | Unsigned Compare | N,Z,C=0,O=0 |
| 23H | imull Src1 * Src2 | Integer multiply (lower half) | N,Z,C,O |
| 24H | imulh Src1 * Src2 | Integer multiply (upper half) | N,Z,C=0,O=0 |
| 25H | umull Src1 * Src2 | Unsigned multiply (lower half) | Z,C |
| 26H | umulh Src1 * Src2 | Unsigned multiply (upper half) | Z,C=0 |
| 27H | TstSt | Test and Set | |
| 28H | rpr | Read Pointer Register | |
| 29H | rcr | Read Control Register | |
| 2AH | rsr | Read Special Register | |
| 2BH | wsr | Write Special Register | |
| 2CH | Ext Byte Ld – Zero Extend | External byte Load Zero Extend | |
| 2DH | Ext Byte Ld – Sign Extend | External Byte load Sign Extend | |
| 2EH | Ext Byte St | External Byte Store | |
| 2FH | Ext Word Ld | External Word Load | |
| 30H | Ext Word St | External Word Store | |
| 31H | itp | Interrupt | |
| 32H–3FH | Reserved | | |

The preferred embodiment of the present invention, a four address instruction arithmetic pipeline and pointer pipeline that operate in parallel and are specially tailored for DTW and HMM pattern recognition procedures is thus described. While the present invention has been described in one particular embodiment, it should be appreciated that the present invention should not be construed as limited by such embodiment, but rather construed according to the below claims.

What is claimed is:

1. An apparatus for executing an arithmetic instruction, said arithmetic instruction including more than three addresses, said apparatus comprising:

means for selecting a first source of information from two addresses of said more than three addresses specified within said arithmetic instruction;

means for selecting a second source of information from an address of said more than three addresses specified within said arithmetic instruction;

means for perforating an operation upon said first source and said second source to generate a result, said operation specified within said arithmetic instruction;

means for selecting a destination storage for said result from an address of said more than three addresses specified within said arithmetic instruction; and means for updating a pointer represented as an address of said more than three addresses specified within said arithmetic instruction, said means for updating a pointer and said means for performing an operation occurring in parallel.

2. An apparatus for performing an arithmetic instruction that includes more than three addresses as described in claim 1 wherein said more than three addresses comprise four addresses; said means for selecting a first source selects from a first or a second address; said means for selecting a second source selects from a third address; and said means for selecting a destination storage selects from a fourth address or said third address.

3. An apparatus for executing an arithmetic instruction as described in claim 1 wherein said means for selecting a first source selects from an address that specifies a first pointer or a first register or said first pointer offset by said first register and said means for selecting a second source selects from an address that specifies a second pointer or an accumulator.

4. An apparatus for executing an arithmetic instruction as described in claim 3 wherein said means for selecting a destination storage selects from an address that specifies a second register or that specifies said second pointer.

5. An apparatus for executing an arithmetic instruction as described in claim 1 wherein said means for selecting a first source selects an address that specifies a byte operand or an address that specifies a word operand.

6. An apparatus for executing an arithmetic instruction as described in claim 5 wherein said means for selecting a second source selects from an address that specifies a byte operand or selects from an address that specifies a word operand and said means for performing an operation upon said first source and said second source executes within one instruction cycle and said result is a word length result.

7. An apparatus for executing an arithmetic instruction as described in claim 1 wherein said means for selecting a first source and said means for selecting a second source may not select addresses from among a same address set and further comprising pairs of complementary ,arithmetic operations for noncommutative operations.

8. An apparatus for executing an arithmetic instruction as described in claim 7 wherein one pair of complementary arithmetic operations includes instructions:

subtract said first source from said second source and subtract said second source from said first source.

9. An apparatus for performing an arithmetic instruction that includes more than three addresses, said apparatus comprising:

means for selecting a first source of information from a first or a second address both specified within said arithmetic instruction;

means for selecting a second source of information from a third address specified within said arithmetic instruction;

means for performing an operation upon said first source and said second source to generate a result;

means for selecting a destination storage for said result from a fourth address specified within said arithmetic instruction; and means for updating a pointer represented as a fifth address specified within said arithmetic instruction, said means for updating a pointer and said means for performing an operation executing in parallel.

10. An apparatus for performing an arithmetic instruction that includes more than three addresses as described in claim 9 wherein said means for selecting a destination storage also selects from said third address.

11. An apparatus for performing an arithmetic instruction that includes more than three addresses as described in claim 10 wherein said third address specifies a second pointer which indicates an address of a second memory location.

12. An apparatus for performing an arithmetic instruction that includes more than three addresses as described in claim 9 wherein said first address specifies a first pointer which indicates an address of a first memory location.

13. An apparatus for performing an arithmetic instruction that includes more than three addresses as described in claim 9 wherein said second address specifies an address of a first register of a plurality of registers within a register file.

14. An apparatus for performing an arithmetic instruction that includes more than three addresses as described in claim 9 wherein said fourth address specifies an address of a second register of a plurality of registers within a register file.

15. An apparatus for performing an arithmetic instruction that includes more than three addresses as described in claim 9 wherein said means for selecting a second source of information selects from an accumulator which contains the most recently stored result of said means for performing an operation.

16. An apparatus for performing an arithmetic instruction that includes more than three addresses as described in claim 15 wherein said means for selecting a second source of information also selects from an immediate data value supplied within said arithmetic instruction; said immediate data value comprising a data word of either 8-bit or 16-bit length.

17. An apparatus for performing an arithmetic instruction having more than three addresses as described in claim 9, further comprising a first source of information containing spatial coordinate information for a data pattern stored in a memory means, a second source of information containing spatial coordinate information for a second data pattern stored in a second memory means to allow the calculation of distance or best path parameters for Dynamic Time Warping or Hidden Markov Models pattern recognition procedures.

18. An apparatus for performing an arithmetic instruction having more than three addresses as described in claim 9 wherein said means for selecting a first source and said means for selecting a second source both comprise source type fields specified within said arithmetic instruction and further comprise multiplexing means for responding to said source type fields for routing information into said first source and said second source.

19. An arithmetic logic unit for executing arithmetic instructions that may include more than three addresses within each arithmetic instruction, said arithmetic logic unit comprising:

means for selecting a first source of information from a first address specified within said arithmetic instruction;

means for selecting a second source of information from a second address specified within said arithmetic instruction;

means for performing an operation upon said first source and said second source to generate a result;

means for selecting a destination storage for said result from a third address specified within said arithmetic instruction; and means for updating a pointer represented as a fourth address specified within said arithmetic instruction.

20. An arithmetic logic unit for executing arithmetic instructions that may include more than three addresses within each arithmetic instruction as described in claim 19 wherein said third address indicates a memory pointer or a register storage location.

21. An arithmetic logic unit for executing arithmetic instructions that may include more than three addresses within each arithmetic instruction as described in claim 19 wherein said first address specifies a first pointer which indicates an address of a first memory location or specifies an address of a first register of a plurality of registers within a register file; said second address specifies a second pointer which indicates an address of a second memory location; and said third address specifies an address of a second register of said plurality of registers within said register file or specifies said second pointer.

22. An arithmetic logic unit for executing arithmetic instructions that may include more than three addresses within each arithmetic instruction as described in claim 19 wherein said means for selecting a first source and said means for selecting a second source both comprise source type fields specified within said arithmetic instruction and further comprise multiplexing means for responding to said source type fields for routing information into said first source and said second source.

23. An apparatus for executing an arithmetic instruction, said instruction specifying more than three addresses and an operation, said apparatus comprising:

a first source type field for selecting an origin address for a first source register from among said more than three addresses;

a second source type field for selecting an origin address for a second source register from among said more than three addresses;

an operator unit for performing said operation upon said first source register and said second source register to generate a result;

a destination type field for selecting a destination address for said result from among said more than three addresses; and a pointer pipeline for updating a pointer represented as an address from among said more than three addresses.

24. An apparatus for executing an arithmetic instruction as described in claim 23 further comprising:

a memory array communicatively coupled to said first and said second source register; and a register file communicatively coupled to said first and said second source register.

25. An apparatus for executing an arithmetic instruction as described in claim 24 wherein said origin address associated with said first source register addresses either said memory array or said register file.

26. An apparatus for executing an arithmetic instruction as described in claim 25 wherein said origin address associated with said second source register addresses either said memory array or an accumulator.

27. An apparatus for executing an arithmetic instruction as described in claim 24 wherein said destination address addresses either said memory array or said register file.

28. An apparatus for performing computations comprising:

an arithmetic logic means for executing an arithmetic instruction, said arithmetic instruction comprising address means for specifying locations of operands, said arithmetic instruction further comprising an operation performed on said operands; and pointer update means for executing a pointer instruction, said pointer instruction for updating said address means for a succedent instruction cycle based on a pointer operation specified within said pointer instruction, said pointer update means executing said pointer instruction in parallel with execution of said arithmetic instruction.

29. An apparatus for performing computations as described in claim 28 wherein said pointer update means also for updating said address means to specify operands for said succedent instruction cycle, said pointer means updating within a same instruction cycle as within which said arithmetic logic means performs said operation.

30. An apparatus for performing computations as described in claim 28 wherein said address means specifies locations of two operands for an instruction cycle and wherein said pointer update means increments said address means to specify new operands for said succedent instruction cycle.

31. An apparatus for performing computations as described in claim 28 wherein said address means also for specifying locations of a result of said operation performed on said operands and wherein said pointer means also for updating said address means to specify a location for a succedent result which is to be produced from said succedent instruction cycle.

32. An apparatus for executing a long instruction comprising:

an arithmetic logic pipeline for executing an arithmetic instruction associated within said long instruction, said arithmetic instruction comprising addresses for specifying locations of operands, said arithmetic instruction further comprising an operation performed on said operands to produce a result; said arithmetic instruction represented in the form of an opcode; and a pointer pipeline for executing a pointer instruction associated within said long instruction, said pointer pipeline executing said pointer instruction within a same instruction cycle as said arithmetic logic pipeline.

33. An apparatus for executing a long instruction as described in claim 32 wherein said pointer pipeline updates said addresses of said opcodes to reference new opcodes for use by said arithmetic logic pipeline in a succedent instruction cycle.

34. An apparatus for executing a long instruction as described in claim 33 wherein said addresses also specify a location of said result and wherein said pointer pipeline also updates said address of said result to reference a succedent result location for use by said arithmetic logic pipeline in said succedent instruction cycle.

35. An apparatus for executing a long instruction as described in claim 32 further comprising a memory array coupled to said pointer pipeline and coupled to said arithmetic logic pipeline and wherein said addresses index entries of said memory array.

36. An apparatus for executing a long instruction as described in claim 35 further comprising a register array coupled to said pointer pipeline and coupled to said arithmetic logic pipeline and wherein said addresses index entries of said memory array or index registers within said register array.

37. A computer system comprising:

bus means for providing communication pathways between system components; central processor means coupled to said bus means; memory means for information storage coupled to said bus means and means for executing an arithmetic instruction, said instruction including more than three addresses, and wherein said means for executing further comprises:

arithmetic logic means for executing an arithmetic instruction, said arithmetic instruction comprising address means for specifying locations of operands, said arithmetic instruction further comprising an operation performed on said operands; and pointer means for executing a pointer instruction, said pointer instruction for updating said address means based on a pointer operation specified within said pointer instruction, said pointer means also for executing said pointer instruction in parallel with said arithmetic instruction.

38. A computer system as described in claim 37 wherein said pointer means also for updating said address means to specify operands for a succedent instruction cycle.

39. A computer system as described in claim 37 wherein said address means specifies locations of two operands for an instruction cycle and wherein said pointer means increments said address means to specify new operands for a succedent instruction cycle.

40. A computer system as described in claim 37 wherein said address means also for specifying locations of a result of said operation performed on said operands and wherein said pointer means also for updating said address means to specify a location for a succedent result which is to be produced from a succedent instruction cycle.

41. A method of executing an arithmetic instruction, said arithmetic instruction including more than three addresses, said method comprising the steps of:

a first step of selecting a first source of information from an address of said more than three addresses specified within said arithmetic instruction;

a second step of selecting a second source of information from an address of said more than three addresses specified within said arithmetic instruction;

a third step of performing an operation upon said first source and said second source to generate a result, said operation specified within said arithmetic instruction;

a fourth step of selecting a destination storage for said result from an address of said more than three addresses specified within said arithmetic instruction; and a fifth step of updating a pointer represented as an address specified within said arithmetic instruction.

42. A method of executing an arithmetic instruction including more than three addresses as described in claim 41 wherein said first step of selecting a first source selects from a first or a second address; said second step of selecting a second source selects from a third address; and said fourth step of selecting selects from a fourth address or said third address.

43. A method of executing an arithmetic instruction including more than 3 addresses as described in claim 41 wherein said first step of selecting a first source comprises the step of selecting from an address that specifies a first pointer or a first register and said second step of selecting a second source comprises the step of selecting from an address that specifies a second pointer or an accumulator.

44. A method of executing an arithmetic instruction including more than 3 addresses as described in claim 43 wherein said fourth step of selecting a destination storage comprises the step of selecting from an address that specifies a second register or that specifies said second pointer.

45. A method of executing an arithmetic instruction including more than 3 addresses as described in claim 41 wherein said first step of selecting a first source comprises the step of selecting from an address that specifies a byte operand or an address that specifies a word operand.

46. A method of executing an arithmetic instruction including more than 3 addresses as described in claim 45 wherein said second step of selecting a second source comprises the step of selecting from an address that specifies a byte operand or an address that specifies a word operand and said third step of performing an operation upon said first source and said second source executes within one instruction cycle and said result is a word length result.

47. A method of executing an arithmetic instruction including more than 3 addresses as described in claim 41 wherein said first step of selecting a first source and said second step of selecting a second source may not select addresses from among a same address set and said method further comprises the step of providing pairs of complementary arithmetic operations for noncommutative operations.

48. A method of executing an arithmetic instruction as described in claim 47 wherein one pair of complementary arithmetic operations includes instructions:

subtract said first source from said second source and subtract said second source from said first source.

49. A method of performing computations comprising:

executing an arithmetic instruction, said arithmetic instruction comprising addresses for specifying locations of operands, said arithmetic instruction further comprising an operation performed on said operands; and simultaneously executing a pointer instruction, said pointer instruction for updating said addresses for a succedent arithmetic instruction based on a pointer operation specified within said pointer instruction.

50. A method of performing computations as described in claim 49 wherein said step of executing a pointer instruction further comprises the step of updating said addresses, during a current instruction cycle, to specify operands for said succedent arithmetic instruction.

51. A method of performing computations as described in claim 49 wherein said addresses specify locations of two operands for an instruction cycle and wherein said step of executing a pointer instruction increments said addresses to specify new operands for said succedent arithmetic instruction.

52. A method for performing computations as described in claim 49 wherein said addresses also specify locations of a result of said operation performed on said operands and wherein said step of executing a pointer instruction updates said addresses to specify a location for a succedent result which is to be produced from said succedent arithmetic instruction.

\* \* \* \* \*

UNITED STATES PATENT AND TRADEMARK OFFICE
CERTIFICATE OF CORRECTION

PATENT NO. : 5,560,039

DATED : September 24, 1996

INVENTOR(S) : Carole Dulong

It is certified that error appears in the above-identified patent and that said Letters Patent is hereby corrected as shown below:

In column 3 at line 43 delete "arc" and insert --are--

In column 25 at line 47 delete "perforating" and insert --performing--

Signed and Sealed this

Thirtieth Day of June, 1998

*Attest:*

BRUCE LEHMAN

*Attesting Officer*   Commissioner of Patents and Trademarks